(12) United States Patent
Kamon et al.

(10) Patent No.: US 6,978,193 B2
(45) Date of Patent: Dec. 20, 2005

(54) POSITIONING DATA CALCULATING PROCEDURE, POSITIONING DATA CALCULATING APPARATUS AND ARTICULATED MANIPULATOR

(75) Inventors: Masayuki Kamon, Akashi (JP); Eiichi Yagi, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 64 days.

(21) Appl. No.: 10/691,668

(22) Filed: Oct. 24, 2003

(65) Prior Publication Data

US 2004/0093123 A1 May 13, 2004

(30) Foreign Application Priority Data

Oct. 30, 2002 (JP) ........................................ 2002-316760

(51) Int. Cl.⁷ .............................................. G06F 19/00
(52) U.S. Cl. ...................... 700/245; 700/245; 700/247; 700/249; 700/248; 700/253; 700/255; 700/259; 318/568.1; 318/568.11; 900/1; 900/15; 900/47
(58) Field of Search ................................ 700/245, 247, 700/249, 253, 255, 248, 258, 259; 318/567, 568.1, 568.11; 900/1, 15, 47

(56) References Cited

U.S. PATENT DOCUMENTS

| | | | | |
|---|---|---|---|---|
| 4,907,937 A | * | 3/1990 | Milenkovic | .................. 414/735 |
| 5,314,293 A | * | 5/1994 | Carlisle et al. | .......... 414/744.5 |

(Continued)

FOREIGN PATENT DOCUMENTS

| | | |
|---|---|---|
| JP | A 56-163624 | 12/1981 |
| JP | A 62-148182 | 7/1987 |
| JP | U 04-115592 | 10/1992 |
| JP | A 10-225881 | 8/1998 |
| JP | A 2001-138279 | 5/2001 |
| JP | 2003-025269 | 1/2003 |
| WO | WO 88/03856 | 6/1988 |

OTHER PUBLICATIONS

Chen et al., A unified optimixaiton approach for a (6+1)-Axis robot system, 1993, IEEE, pp. 560–565.*

(Continued)

*Primary Examiner*—Thomas G. Black
*Assistant Examiner*—McDieunel Marc
(74) *Attorney, Agent, or Firm*—Oliff & Berridge, PLC

(57) ABSTRACT

A positioning data calculating procedure calculates analytically relative rotation angles for the links arranged in series to form an articulated manipulator to locate an object in a desired orientation at a desired position. Coordinate expressions including an x-coordinate expression representing the x-coordinate of a triaxial intersection point, a yz addition coordinate expression representing the sum of the y- and the z-coordinate of the triaxial intersection point, and a yz subtraction coordinate expression representing the remainder of subtraction of the z-coordinate from the y-coordinate of the triaxial intersection point, and including first to third rotation angles corresponding to rotation angles through which the second link is turned relative to the first link, through which the third link is turned relative to the second link, and through which the fourth link is turned relative to the third link as variables are solved. The first to the third rotation angles can easily and analytically be determined by using the yz addition coordinate expression and the yz subtraction coordinate expression. Fourth to sixth angles can analytically be determined on the basis of the first to the third rotation angle. The determination of the first to the sixth rotation angle by an analytical operation needs a time shorter than that needed by the determination of the same by a convergence operation.

10 Claims, 9 Drawing Sheets

U.S. PATENT DOCUMENTS

| | | | | | |
|---|---|---|---|---|---|
| 5,646,413 | A | * | 7/1997 | Nishi | 250/548 |
| 5,844,247 | A | * | 12/1998 | Nishi | 250/548 |
| 6,051,843 | A | * | 4/2000 | Nishi | 250/548 |
| 6,374,158 | B1 | * | 4/2002 | Fusaro, Jr. | 700/254 |
| 6,408,224 | B1 | * | 6/2002 | Okamoto et al. | 700/245 |
| 6,430,475 | B2 | * | 8/2002 | Okamoto et al. | 700/245 |
| 6,463,356 | B1 | * | 10/2002 | Hattori et al. | 700/245 |
| 6,580,970 | B2 | * | 6/2003 | Matsuda et al. | 700/245 |
| 6,580,971 | B2 | * | 6/2003 | Bunn et al. | 700/259 |
| 6,604,021 | B2 | * | 8/2003 | Imai et al. | 700/245 |
| 6,640,160 | B2 | * | 10/2003 | Takahashi et al. | 700/245 |
| 6,697,709 | B2 | * | 2/2004 | Kuroki et al. | 700/245 |
| 2002/0188379 | A1 | * | 12/2002 | McGee | 700/245 |
| 2003/0010148 | A1 | | 1/2003 | Okamoto et al. | |
| 2003/0093183 | A1 | * | 5/2003 | Bunn et al. | 700/259 |
| 2004/0028516 | A1 | * | 2/2004 | Brogardh | 414/735 |
| 2004/0073335 | A1 | * | 4/2004 | Gong | 700/245 |
| 2004/0129103 | A1 | | 7/2004 | Kamon et al. | |

OTHER PUBLICATIONS

Kozakiewicz et al., Partitioned neural network architecture for inverse kinematic calculation of a 6dof robot manipulator, 2001, IEEE, pp. 2001–2006.*

Sokolov, Robot motion realisation using labview, 1999, Internet, pp. 131–145.*

Krabbes et al., Modelling of robot dynamics based on a multi–dimensional RBF–like neural network, 1999, IEEE, pp. 180–187.*

"15$^{th}$ International Symposium On Industrial Robots", Proceedings vol. 1, 1985.

* cited by examiner

POSITIONING DATA CALCULATING PROCEDURE, POSITIONING DATA CALCULATING APPARATUS AND ARTICULATED MANIPULATOR

BACKGROUND OF THE INVENTION

1. Field of the Invention

The present invention relates to an articulated manipulator comprising a plurality of links, and joints rotatably connecting the links. More particularly, the present invention relates to an articulated manipulator comprising a plurality of links, and coaxial joints each for connecting the two adjacent links for coaxial rotation, and diagonal joints each for connecting the two adjacent links such that one of the two adjacent links makes a conical revolution relative to the other.

2. Description of the Related Art

Prior art related to articulated manipulators disclosed in, for example, JP62-148182A, JP56-163624A and JP2001-138279A has a diagonal joint connecting two links. The diagonal joint connects the two links such that one of the two links makes a conical revolution on the diagonal joint. Each of the two adjacent links connected by the diagonal joint revolves about a rotation axis inclined at a predetermined angle to its axis.

For example, an articulated manipulator comprises a plurality of links arranged in series, and a plurality of joints rotatably connecting the adjacent links, respectively. The joints include coaxial joints and diagonal joints. The coaxial joint connects the adjacent links so that the adjacent links are able to turn about a rotation axis aligned with their axes. The diagonal joint connects the adjacent links such that one of the two adjacent links is able to make a conical revolution relative to the other about a rotation axis inclined at an angle to its axis.

The articulated manipulator moves a terminal device connected to its terminal end along a predetermined path. The motion of the terminal device needs to be converted into the respective turning motions of the links to move the terminal device by the articulated manipulator; that is, the rotation angles of the links must be determined by inverse transformation on the basis of a position at which the terminal device is to be positioned and an orientation in which the terminal device is to be set.

According to the prior art disclosed in JP56-163624A, the inverse transformation is impossible unless the articulated manipulator has seven joints connecting the links, namely, a coaxial joint, a diagonal joint, a coaxial joint, a diagonal joint, a coaxial joint, a diagonal joint and a coaxial joint arranged in that order. In the case of using this prior art, analytical solution cannot be obtained through inverse transformation for an articulated manipulator having less than seven joints. Therefore, there has been no articulated manipulator having six or less joints.

If there is an articulated manipulator having six joints, complicated simultaneous equations must be solved for inverse transformation. It is difficult to obtain analytical solutions even if a computer capable of executing a formula manipulation program is used for solving the complicated simultaneous equations. Therefore, the rotation angles of the links of an articulated manipulator having six or less joints must be determined by a convergence operation, such as an operation using the Newton-Raphson formula. The rotation angles of the links cannot be determined quickly by the convergence operation.

Technique disclosed in JP2001-138279A determines rotation angles of the links by an interpolatory approximation method. This method determines a representative point and orientation of the terminal end of the articulated manipulator by an analytical direct transformation after the rotation angles of the links are determined, and stores rotation angles of the links with the terminal device located at a plurality of representative points in a database beforehand. Inverse transformation determines rotation angles of the links by interpolatory approximation using data included in the database. The terminal end of an articulated manipulator having less than seven joints cannot accurately be positioned and oriented by operating the articulated manipulator on the basis of this method because the rotation angles are approximate values.

FIG. 10 shows a part of an articulated manipulator 1 whose location is controlled by interpolatory approximation. Generally, the articulated manipulator 1 stores rotation angles of its links when a terminal device 10 is located at representative points. For example, to move the terminal device 10 from a first representative point A to a second representative point B, the articulated manipulator 1 reads the rotation angles of the links with the terminal device 10 at the representative point A, and those of the links with the terminal device 10 at the representative point B from the database. Then, the articulated manipulator 1 carries out interpolatory calculations using the rotation angles of the links with the terminal device 10 at the representative point A and those of the same with the terminal device 10 at the representative point B to determine interpolated rotation angles. The links are turned to the interpolated rotation angles to shift the terminal device 10 from the representative point A to the representative point B.

Since the links are turned to the rotation angles determined by interpolatory approximation, the terminal device 10 cannot accurately be located; that is, the terminal device 10 cannot smoothly moved along a prescribed path.

There are a plurality of combinations of the rotation angles of the links to set the terminal device 10 in a desired orientation at a desired position. However, when the rotation angles of the links are determined by a convergence operation or interpolatory approximation, only a single combination of rotation angles can be determined and hence an optimum combination of rotation angles of the links cannot be determined.

The rotation angles of the links of the articulated manipulator having six or less joints cannot analytically be determined in locating the terminal device 10 in a desired orientation at a desired position and, consequently, the terminal device 10 cannot quickly and accurately be located in the desired orientation at the desired position. Moreover, a plurality of combinations of the rotation angles of the links cannot be determined.

SUMMARY OF THE INVENTION

Accordingly, it is an object of the present invention to provide a positioning data calculating procedure and a positioning data calculating apparatus capable of analytically determining angles of the links of an articulated manipulator to locate an object in a desired orientation at a desired position.

According to a first aspect of the present invention, a positioning data calculating procedure for calculating relative rotation angles for first to sixth links arranged in series and included in an articulated manipulator including coaxial joints each connecting the adjacent ones of the first to the sixth link so that the adjacent links are able to turn about a rotation axis aligned with their axes, and diagonal joints each connecting the adjacent ones of the first to the sixth link so that the adjacent links are able to revolve about a rotation axis inclined to their axes, in which the sixth link is attached rotatably to a predetermined object, and a rotation axis about which the sixth link and the object turn, a rotation axis about which the fifth and the sixth link turn and a rotation axis about which the fourth and the fifth link turn intersect each other at a triaxial intersection point comprises: a data entering step of entering data on position and orientation of the object in a reference coordinate system with an x-axis, a y-axis and a z-axis orthogonally intersecting each other and fixed relative to the first link; a triaxial intersection point coordinate calculating step of calculating x-, y- and z-coordinate of the triaxial intersection point in the reference coordinate system on the basis of the entered data on the position and orientation of the object; a first-to-third rotation angle calculating step of calculating first to third rotation angles by solving coordinate expressions including an x-coordinate expression representing the x-coordinate of the triaxial intersection point, a yz addition coordinate expression representing the sum of the y- and the z-coordinate of the triaxial intersection point, and a yz subtraction coordinate expression representing the remainder of subtraction of the z-coordinate from the y-coordinate of the triaxial intersection point, and including a first rotation angle corresponding to a rotation angle through which the second link is turned relative to the first link, a second rotation angle corresponding to a rotation angle through which the third link is turned relative to the second link, and a third rotation angle corresponding to a rotation angle through which the fourth link is turned relative to the third link as variables; and a fourth-to-sixth angle calculating step of calculating a fourth rotation angle through which the fifth link is turned relative to the fourth link, a fifth rotation angle through which the sixth link is turned relative to the fifth link, and a sixth rotation angle through which the object is turned relative to the sixth link on the basis of the first to the third rotation angle and the orientation of the object.

According to the present invention, the articulated manipulator as an object of orientation control has the triaxial intersection point where the rotation axis about which the object and the sixth link turn, the rotation axis about which the sixth and the fifth link turn, and the rotation axis about which the fifth and the fourth link turn are coincident. Therefore the coordinates of the triaxial intersection point can uniquely be determined when the position and orientation of the object is determined. The object may be, for example, a base or a terminal device.

When the data on the position and orientation of the object is entered, the x-, the y- and the z-coordinate of the triaxial intersection point can be determined. The coordinate expressions including the x-coordinate expression, the yz addition coordinate expression and the yz subtraction coordinate expression are solved. The use of the yz addition coordinate expression and the yz subtraction coordinate expression enables the analytical determination of the first to the third angle included in the coordinate expressions. When the first to the third angle are determined by the first-to-third angle calculating step, the fourth to the sixth angle can analytically be determined by the fourth-to-sixth angle calculating step.

Thus, the first to the sixth angle can quickly and accurately be determined through the analytical solution of the expressions. All the possible combinations of the angles can be obtained in moving the object to a desired position.

According to a second aspect of the present invention, a rotation angle calculating procedure for calculating relative rotation angles for first to sixth links arranged in series and included in an articulated manipulator including coaxial joints each connecting the adjacent ones of the first to the sixth link so that the adjacent links are able to turn about a rotation axis aligned with their axes, and diagonal joints each connecting the adjacent ones of the first to the sixth link so that the adjacent links are able to revolve about a rotation axis inclined to their axes, in which the sixth link is attached rotatably to a predetermined object, and a rotation axis about which the fifth and the sixth link turn, and a rotation axis about which the fourth and the fifth link turn intersect each other at a biaxial intersection point comprises: a data entering step of entering data on a position and orientation of the object in a reference coordinate system with an x-axis, a y-axis and a z-axis orthogonally intersecting each other and fixed relative to the first link; a biaxial intersection point coordinate calculating step of calculating x-, y- and z-coordinate of the biaxial intersection point in the reference coordinate system on the basis of the entered data on the position and orientation of the object; a first-to-third angle calculating step of calculating first to third angles by solving coordinate expressions including an x-coordinate expression representing the x-coordinate of the biaxial intersection point, a yz addition coordinate expression representing the sum of the y- and the z-coordinate of the biaxial intersection point, and a yz subtraction coordinate expression representing the remainder of subtraction of the z-coordinate from the y-coordinate of the biaxial intersection point, and including a first angle corresponding to a rotation angle through which the second link is turned relative to the first link, a second angle corresponding to a rotation angle through which the third link is turned relative to the second link, and a third angle corresponding to a rotation angle through which the fourth link is turned relative to the third link as variables; and a fourth-and-fifth angle calculating step of calculating a fourth rotation angle through which the fifth link is turned relative to the fourth link, and a fifth rotation angle through which the sixth link is turned relative to the fifth link, on the basis of the first to the third rotation angle and the orientation of the object.

According to the present invention, the articulated manipulator as an object of orientation control has the biaxial intersection point where the rotation axis about which the sixth and the fifth link turn, and the rotation axis about which the fifth and the fourth turn are coincident. Therefore the coordinates of the biaxial intersection point can uniquely be determined when the position and orientation of the object is determined. The object may be, for example, a base or a terminal device.

When the data on the position and orientation of the object is entered, the x-, the y- and the z-coordinate of the biaxial intersection point can be determined. The coordinate expressions including the x-coordinate expression, the yz addition coordinate expression and the yz subtraction coordinate expression are solved. The use of the yz addition coordinate expression and the yz subtraction coordinate expression enables the analytical determination of the first to the third angle included in the coordinate expressions. When the first to the third angle are determined by the first-to-third angle calculating step, the fourth and the fifth angle can analytically be determined by the fourth-and-fifth angle calculating step.

Thus, the first to the fifth angle can quickly and accurately be determined through the analytical solution of the expressions. All the possible combinations of the angles can be obtained to move the object to a desired position.

According to a third aspect of the present invention, a positioning data calculating apparatus for calculating relative rotation angles of first to sixth links arranged in series and included in an articulated manipulator including coaxial joints each connecting the adjacent ones of the first to the sixth link so that the adjacent links are able to turn about a rotation axis aligned with their axes, and diagonal joints each connecting the adjacent ones of the first to the sixth link so that the adjacent links are able to revolve about a rotation axis inclined to their axes, in which the sixth link is attached rotatably to a predetermined object, and a rotation axis about which the sixth link and the object turn, a rotation axis about which the fifth and the sixth link turn and a rotation axis about which the fourth and the fifth link turn intersect each other at a triaxial intersection point comprises: a data entering means for entering data on a position and orientation of the object in a reference coordinate system with an x-axis, a y-axis and a z-axis orthogonally intersecting each other and fixed relative to the first link; a calculating means for calculating an x-, a y- and z-coordinate of the triaxial intersection point in the reference coordinate system on the basis of the entered data on the position and orientation of the object, determining first to third rotation angles by solving coordinate expressions including an x-coordinate expression representing the x-coordinate of the triaxial intersection point, a yz addition coordinate expression representing the sum of the y- and the z-coordinate of the triaxial intersection point, and a yz subtraction coordinate expression representing the remainder of subtraction of the z-coordinate from the y-coordinate of the triaxial intersection point, and including a first angle corresponding to a rotation angle through which the second link is turned relative to the first link, a second angle corresponding to a rotation angle through which the third link is turned relative to the second link, and a third angle corresponding to a rotation angle through which the fourth link is turned relative to the third link as variables, and calculating a fourth rotation angle through which the fifth link is turned relative to the fourth link, a fifth rotation angle through which the sixth link is turned relative to the fifth link, and a sixth rotation angle through which the object is turned relative to the sixth link on the basis of the first to the third rotation angle and the orientation of the object; and an output means for providing calculated data calculated by the calculating means.

According to the present invention, the articulated manipulator as an object of orientation control has the triaxial intersection point where the rotation axis about which the object and the sixth link turn, the rotation axis about which the sixth and the fifth link turn, and the rotation axis about which the fifth and the fourth link turn are coincident. Therefore the coordinates of the triaxial intersection point can uniquely be determined when the position and orientation of the object is determined. The object may be, for example, a base or a terminal device.

When the data on the position and orientation of the object is entered by the data entering means, the x-, the y- and the z-coordinate of the triaxial intersection point can be determined. The calculating means solves the coordinate expressions including the x-coordinate expression, the yz addition coordinate expression and the yz subtraction coordinate expression. The first to the third angle included in the coordinate expressions can analytically be determined by using the yz addition coordinate expression and the yz subtraction coordinate expression. When the first to the third angle are determined, the fourth to the sixth angle can analytically be determined on the bass of the first to the third angle. The calculating means gives the first to the sixth angle to the output means, and the output means delivers the calculated results.

Thus, the first to the sixth angle can quickly and accurately be determined through the analytical solution of the expressions in locating the object in a desired orientation at a desired position. All the possible combinations of the angles can be obtained in moving the object to a desired position.

According to a fourth aspect of the present invention, a positioning data calculating apparatus for calculating relative rotation angles for first to sixth links arranged in series and included in an articulated manipulator including coaxial joints each connecting the adjacent ones of the first to the sixth link so that the adjacent links are able to turn about a rotation axis aligned with their axes, and diagonal joints each connecting the adjacent ones of the first to the sixth link so that the adjacent links are able to revolve about a rotation axis inclined to their axes, in which the sixth link is attached rotatably to a predetermined object, and a rotation axis about which the fifth link and the sixth link turn, and a rotation axis about which the fourth and the fifth link turn intersect each other at a biaxial intersection point comprise: a data entering means for entering data on a position and orientation of the object in a reference coordinate system with an x-axis, a y-axis and a z-axis orthogonally intersecting each other and fixed relative to the first link; a calculating means for calculating x-, y- and z-coordinate of the biaxial intersection point in the reference coordinate system on the basis of the entered data on the position and orientation of the object, determining first to third rotation angles by solving coordinate expressions including an x-coordinate expression representing the x-coordinate of the biaxial intersection point, a yz addition coordinate expression representing the sum of the y- and the z-coordinate of the biaxial intersection point, and a yz subtraction coordinate expression representing the remainder of subtraction of the z-coordinate from the y-coordinate of the biaxial intersection point, and including a first angle corresponding to a rotation angle through which the second link is turned relative to the first link, a second angle corresponding to a rotation angle through which the third link is turned relative to the second link, and a third angle corresponding to a rotation angle through which the fourth link is turned relative to the third link as variables, and calculating a fourth rotation angle through which the fifth link is turned relative to the fourth link, and a fifth rotation angle through which the sixth link is turned relative to the fifth link on the basis of the first to the third rotation angle and the orientation of the object; and an output means for providing calculated data calculated by the calculating means.

According to the present invention, the articulated manipulator as an object of orientation control has the biaxial intersection point where the rotation axis about which the sixth link and the fifth link turn, and the rotation axis about which the fifth and the fourth link turn are coincident. Therefore the coordinates of the biaxial intersection point can uniquely be determined when the position and orientation of the object is determined. The object may be, for example, a base or a terminal device.

When the data on the position and orientation of the object is entered by the data entering means, the x-, the y- and the z-coordinate of the biaxial intersection point can be determined by the calculating means. The calculating means solves the coordinate expressions including the x-coordinate expression, the yz addition coordinate expression and the yz subtraction coordinate expression. The first to the third angle included in the coordinate expressions can analytically be determined by using the yz addition coordinate expression and the yz subtraction coordinate expression. When the first to the third angle are determined, the fourth and the fifth angle can analytically be determined on the bass of the first to the third angle. The calculating means gives the first to the fifth angle to the output means, and the output means provides the calculated results.

Thus, the first to the fifth angle can quickly and accurately be determined through the analytical solution of the expressions in locating the object in a desired orientation at a desired position. All the possible combinations of the angles can be obtained to move the object to a desired position.

According to a fifth aspect of the present invention, an articulated manipulator comprises: first to sixth links arranged in series; coaxial joints each connecting the adjacent ones of the first to the sixth link so that the adjacent links are able to turn about a rotation axis aligned with their axes; and diagonal joints each connecting the adjacent ones of the first to the sixth link so that the adjacent links are able to revolve about a rotation axis inclined to their axes;

wherein the sixth link is attached rotatably to a predetermined object so that the object is able to turn about the axis of the sixth link, the fifth and the sixth link are connected by the diagonal joint, the fourth and the fifth link are connected by the coaxial joint, the third and the fourth link are connected by the diagonal joint, the second and the third link are connected by the coaxial joint, and the first and the second link are connected by the diagonal joint.

According to the present invention, a rotation axis about which the object and the sixth link turn, a rotation axis about which the sixth and the fifth link turn, and a rotation axis about which the fifth and the fourth link turn are coincident at a triaxial intersection point. Therefore the coordinates of the triaxial intersection point can uniquely be determined by an orientation controller when the position and orientation of the object is determined. The orientation controller is able to determine analytically the first to the sixth angle for the links for locating the object in a desired orientation at a desired position.

When at least the rotation axis about which the two links connected by the diagonal joint among the joints connecting the first to the third link turn inclines at an angle of 45° to the axes of the two links connected by the diagonal joint, the orientation controller is able to determine the angle by using simple expressions. Thus, the orientation controller is able to determine the first to the sixth angle in a shorter time.

According to a sixth aspect of the present invention, an articulated manipulator comprises: first to sixth links arranged in series; coaxial joints each connecting the adjacent ones of the first to the sixth link so that the adjacent links are able to turn about a rotation axis aligned with their axes; and diagonal joints each connecting the adjacent ones of the first to the sixth link so that the adjacent links are able to revolve about a rotation axis inclined to their axes;

wherein the sixth link is fixedly connected to a predetermined object, the fifth and the sixth link are connected by the diagonal joint, the fourth and the fifth link are connected by the coaxial joint, the third and the fourth link are connected by the diagonal joint, the second and the third link are connected by the coaxial joint, and the first and the second link are connected by the diagonal joint.

According to the present invention, a rotation axis about which the fifth and the sixth link turn, and a rotation axis about which the fifth and the fourth link turn are coincident at a biaxial intersection point. Therefore the coordinates of the biaxial intersection point can uniquely be determined by an orientation controller when the position and orientation of the object is determined. The orientation controller is able to determine analytically the first to the fifth angle for the links for locating the object in a desired orientation at a desired position.

When at least the rotation axis about which the two links connected by the diagonal joint among the joints connecting the first to the third link turn inclines at an angle of 45° to the axes of the two links connected by the diagonal joint, the orientation controller is able to determine the angle by using simple expressions. Thus, the orientation controller is able to determine the first to the sixth angle in a shorter time.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
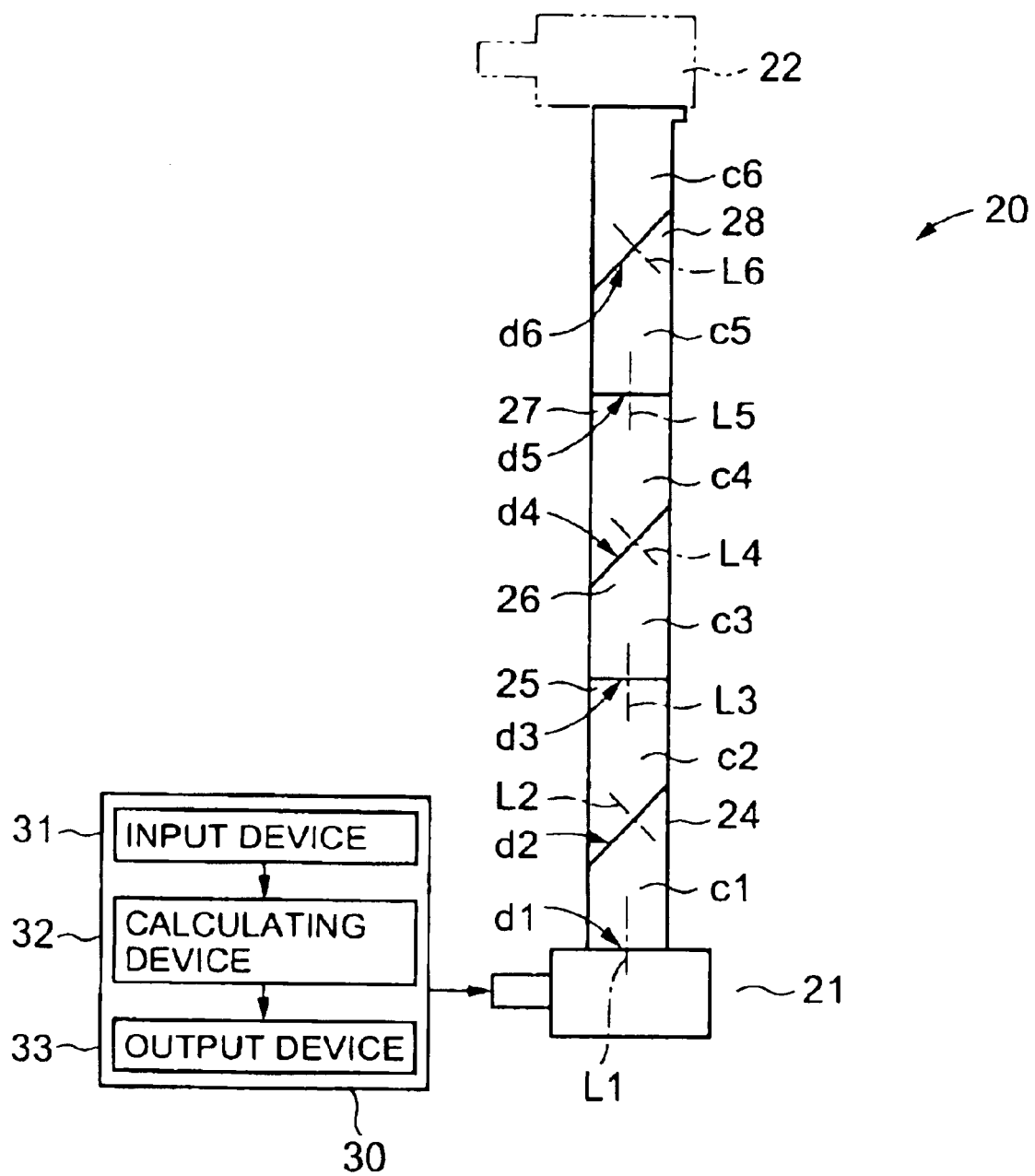
FIG. 1 is a schematic front elevation of an articulated manipulator in a first embodiment according to the present invention.

Referring to FIG. 1, an articulated manipulator 20 in a first embodiment according to the present invention has an arm assembly formed by connecting a plurality of links in series by joints. The joints include coaxial joints and diagonal joints. Each coaxial joint connects the adjacent links so as to be turnable about a rotation axis aligned with the respective axes of the adjacent links. Each diagonal joint connects the two adjacent links such that the two adjacent links are able to make a conical revolution about a rotation axis inclined to the respective axes of the two adjacent links. In this specification, the term "conical revolution" signifies the revolution of one of two adjacent links connected by a joint on the joint about a rotation axis relative to the other on an imaginary cone having its tip on the joint, and the term "rotation" signifies angular displacements including those through angles not greater than 360°. The articulated manipulator thus formed by assembling the links, the coaxial joints and the diagonal joints is capable of positioning a terminal device in a three-dimensional space by turning the links so that the articulated manipulator twists and turns like a snake. Thus, the articulated manipulator of the present invention is capable of satisfactorily operating in complicated facilities in which the articulated manipulator needs to operate along complicated work paths.

The articulated manipulator of the present invention is used as an industrial robot. A desired terminal device, i.e., an end effector, can be attached to the free end of the articulated manipulator, the terminal device can be positioned at a desired position, and can operate for necessary work in a narrow space. The articulated manipulator can be used in many tasks, such as material handling, sealing, painting, arc welding and such.

Referring to FIG. 1, an articulated manipulator 20 in a first embodiment according to the present invention is a six-degree of freedom articulated manipulator including six links, namely, a first link $c1$, a second link $c2$, a third link $c3$, a fourth link $c4$, a fifth link $c5$ and a sixth link $c6$, and six joints, namely, a first joint $d1$, a second joint $d2$, a third joint $d3$, a fourth joint $d4$, a fifth joint $d5$ and a sixth joint $d6$, connecting the adjacent links. The joints $d1$ to $d6$ connects the links $c1$ to $c6$ to form an arm assembly. The three joints $d1$, $d3$ and $d5$ are coaxial joints, and the three joints $d2$, $d4$ and $d6$ are diagonal joints. Each of the diagonal joints $d2$, $d4$ and $d6$ connects the adjacent links such that the two adjacent links are able to revolve relative to each other about a rotation axis inclined at an angle of 45° to the respective axes of the adjacent links.

The links $c1$ to $c6$ are arranged in series in that order from a base end outward. A terminal device 22 is connected to the free end of the sixth link $c6$. The links $c1$ to $c6$ can coaxially be extended in a straight structure as shown in FIG. 1.

The coaxial joint $d1$ connects an inner end 23 of the first link $c1$ to a base 21. The base 21 may fixedly be installed at a predetermined position or may be movable. The first link $c1$ is able to rotate about a rotation axis $L1$ coaxial with its axis relative to the base 21. The diagonal joint $d2$ connects an outer end 24 of the first link $c1$ to the second link $c2$.

The second link $c2$ is able to make a conical revolution relative to the first link $c1$ on the diagonal joint $d2$ about an inclined rotation axis $L2$ inclined at an angle of 45° to the axis of the second link $c2$. The coaxial joint $d3$ connects an outer end 25 of the second link $c2$ opposite the first link $c1$ to the third link $c3$.

The second link $c2$ and the third link $c3$ are able to turn about a rotation axis $L3$ aligned with their axes. The diagonal joint $d4$ connects an outer end 26 of the third link $c3$ opposite the second link $c2$ to the fourth link $c4$.

The third link $c3$ and the fourth link $c4$ are able to make a conical revolution relative to each other on the diagonal joint $d4$ about an inclined rotation axis $L4$ inclined at an angle of 45° to the respective axes of the third link $c3$ and the fourth link $c4$. The coaxial joint $d5$ connects an outer end 27 of the fourth link $c4$ opposite the third link $c3$ to the fifth link $c5$.

The fourth link $c4$ and the fifth link $c5$ are able to rotate about a rotation axis $L5$ aligned with the respective axes of the fourth link $c4$ and the fifth link $c5$. The diagonal joint $d6$ connects an outer end 28 of the fifth link $c5$ opposite the fourth link $c4$ to the sixth link $c6$.

The fifth link $c5$ and the sixth link $c6$ are able to make a conical revolution relative to each other on the diagonal joint $d6$ about an inclined rotation axis $L6$ inclined at an angle of 45° to the respective axes of the fifth link $c5$ and the sixth link $c6$. The terminal device 22 is connected to an outer end of the sixth link $c6$ opposite the fifth link $c5$. The terminal device 22 may be any suitable device, such as a material handling device capable of gripping parts.

The coaxial joints and the diagonal joints are arranged alternately in the arm assembly formed by connecting the links $c1$ to $c6$ in series. The arm assembly can straight be extended with all the axes of the links $c1$ to $c6$ in alignment. The articulated manipulator 20 has a triaxial intersection point where the rotation axis $L1$ about which the base 21 and the first link $c1$ turn, the second rotation axis $L2$ about which the first link $c1$ and the second link $c2$ revolve, and the rotation axis $L3$ about which the second link $c2$ and the third link $c3$ turn are coincident.

Rotary motors are incorporated into the links $c1$ to $c6$ to drive the links $c1$ to $c6$ for rotation. The links $c1$ to $c6$ are hollow members respectively having bores. Power lines, signal lines and tubes are passed through the bores of the links $c1$ to $c6$ to supply power to the rotary motors, to send control signals to the rotary motors and to supply compressed air to the terminal device 22.

A conventional rotating mechanism may be employed for turning each of the links $c1$ to $c6$ about the rotation axis. For example, the articulated manipulator 20 may be provided for turning each of the links $c1$ to $c6$ with a rotating mechanism including bearings supporting the adjacent links for turning about the rotation axis, and a hollow waving gear mechanism, such as a Harmonic drive®. The waving gear mechanism has an input member and an output member, and the input and the output member rotate relative to each other. When the waving gear mechanism is employed, one of the adjacent links is connected to the input member, and the other is connected to the output member. When the input member is driven for rotation by the rotary motor, the input and the output member rotate relative to each other to turn the adjacent links relative to each other. The adjacent links can be turned relative to each other by providing the links $c1$ to $c6$ with such rotating mechanisms. The use of the hollow waving gear mechanism (Harmonic drive®) enables the adjacent links to turn relative to each other with the power lines and signal lines extended through the links $c1$ to $c6$. The articulated manipulator 20 can be suited for use in a dusty, explosive, humid working environment by covering the articulated manipulator 20 entirely or covering the power lines and signal lines extended through the bores of the links $c1$ to $c6$ with a cover formed of a waterproof, heat-resistant, shock-resistant material.

As shown in FIG. 1, the articulated manipulator 20 is provided with a positioning arithmetic unit 30 for calculating angles of the links $c1$ to $c6$ relative to each other. The positioning arithmetic unit 30 calculates relative rotation angles $\theta_1$ to $\theta_6$ through which the links $c1$ to $c6$ are to be turned, respectively, to locate the terminal device 22 in a desired orientation at a desired position.

The positioning arithmetic unit 30 includes an input device 31, a calculating device 32 and an output device 33. The input device 31 gives the calculating device 32 data on a position and an orientation in which the terminal device 22 is to be located in a reference coordinate system. The calculating device 32 calculates relative rotation angles $\theta_1$ to $\theta_6$ through which the links $c1$ to $c6$ are to be turned to locate the terminal device 22 in the desired orientation at the desired position on the basis of the data given thereto by the input device 31 and the dimensions of the articulated manipulator 20. The output device 33 provides power signals and control signals for turning the links c1 to c6 on the basis of calculated data provided by the calculating device 32. Consequently, the links c1 to c6 are turned according to the calculated data.

The positioning arithmetic unit 30 is, for example, a computer. The input device 31 includes a pointing device, such as a keyboard or a mouse, and a teaching pendant controller to be operated by the operator for the direct control of the articulated manipulator 20 by the operator. The input device 31 may be capable of entering data on a position and orientation of the end effector provided by an external device connected to the positioning arithmetic unit 30. The output device 33 generates control signals for controlling the operation of the drive motors on the basis of the calculated data, and gives the control signals to the drive motors. The output device 33 may be, for example, a drive circuit. The positioning arithmetic unit 30 may be either built in the articulated manipulator 20 or installed outside the articulated manipulator 20.

The calculating device 32 includes a central processing unit (CPU) that executes arithmetic programs. The arithmetic programs may be stored beforehand in the CPU or may be stored in a storage device and read by the CPU. The arithmetic programs prescribe calculating methods, which will be described later.

Figure 2:
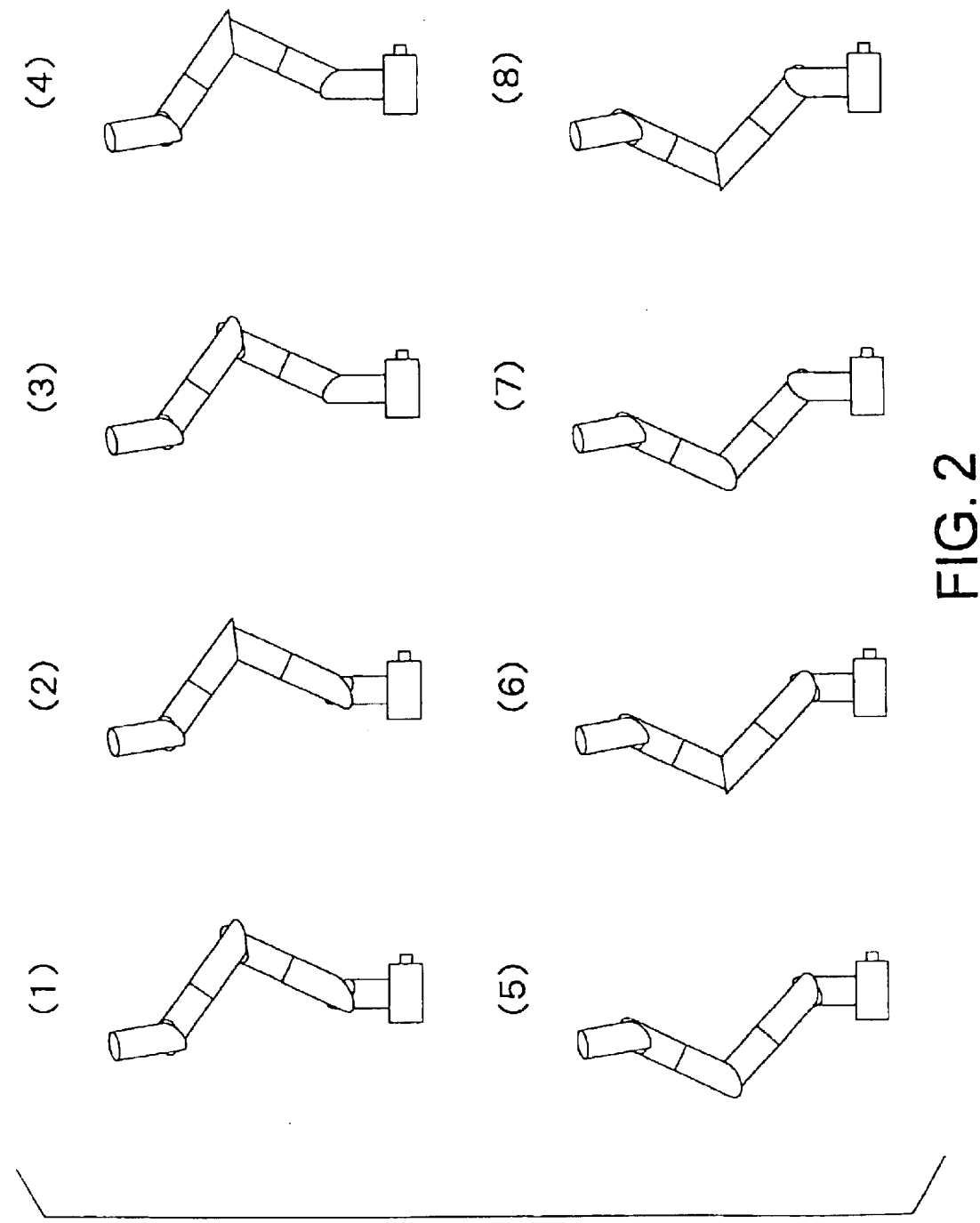
FIGS. 2(1) to 2(8) are views of the articulated manipulator shown in FIG. 1 in different shapes, respectively, formed by orientation control operations executed by a positioning arithmetic unit.

FIGS. 2(1) to 2(8) are views of the articulated manipulator 20 in different shapes, respectively, formed by orientation control operations executed by the positioning arithmetic unit 30. The positioning arithmetic unit 30 calculates values of the rotation angles $\theta_1$ to $\theta_6$ through which the links c1 to c6 must be turned, respectively, to locate the terminal device in a desired orientation at a desired position by using analytical expressions. There are eight combinations of the rotation angles $\theta_1$ to $\theta_6$ for locating the terminal device 22 held on the six-axis articulated manipulator 20 in a desired orientation at a desired position. The arithmetic unit 30 is able to provide the eight combinations of the angles $\theta_1$ to $\theta_6$ simultaneously by calculating the $\theta_1$ to $\theta_6$ using the analytical expressions. The terminal device 22 can be located in a desired orientation at a desired position by bending the articulated manipulator 20 in any one the eight shapes shown in FIGS. 2(1) to 2(8). One of the eight combinations of the $\theta_1$ to $\theta_6$ through which the links c1 to c6 are to be turned is selected taking into consideration energy cost and obstacles around the articulated manipulator 20.

Figure 3:
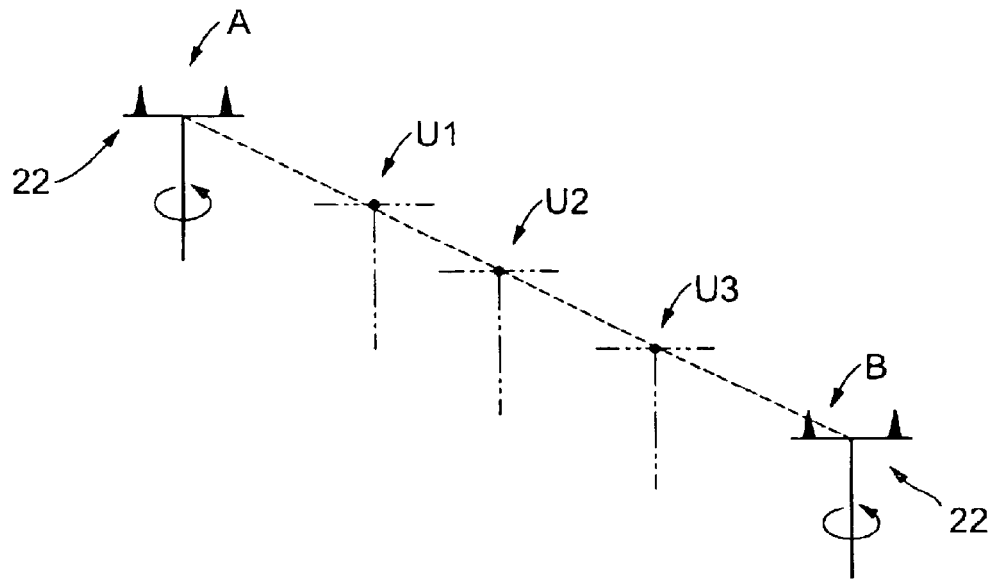
FIG. 3 is diagrammatic view of assistance in explaining an orientation control operation to be carried out by the positioning arithmetic unit to control the articulated manipulator in moving a terminal device.

FIG. 3 is diagrammatic view of assistance in explaining an orientation control operation to be carried out by the positioning arithmetic unit 30 to control the articulated manipulator 20 in moving the terminal device 20. When it is desired to move the terminal device 22 from a first representative point A to a second representative point B, intermediate points U1 to U3 that is to be passed by the terminal device 22 when the terminal device 22 moves from the first representative point A to the second representative point B are determined. Rotation angles through which the links c1 to c6 are to be turned to locate the terminal device 22 at the intermediate points U1 to U3 are calculated to move the terminal device 22 smoothly along a specified path including the intermediate points U1 to U3.

The positioning arithmetic unit 30 does not need to perform the convergence operation, which must be performed by the conventional articulated manipulator, to determine the rotation angles for the links c1 to c6. Therefore, the rotation angles can quickly be determined, the calculating device 32 does not need to have a high data processing ability, and the rotation angles for the links can be calculated even during the movement of the terminal device 22. The rotation angles for the links c1 to c6 at the representative points A and B do not need to stored in a database, the storage capacity of the CPU may be small.

Figure 4:
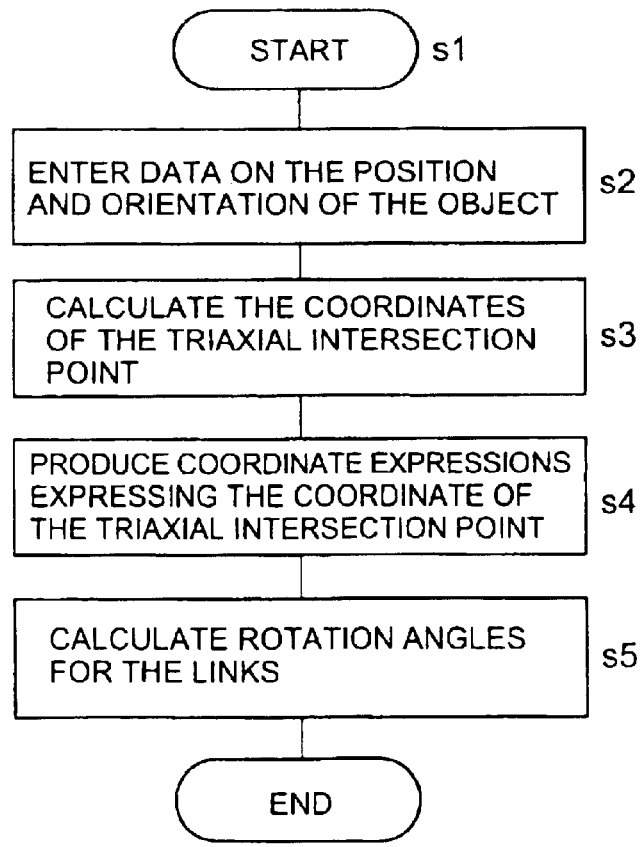
FIG. 4 is a flow chart of a positioning data calculating procedure to be executed by the positioning arithmetic unit.

Referring to FIG. 4 showing a flow chart of a positioning data calculating procedure to be executed by the positioning arithmetic unit 30, data on the articulated manipulator 20 to be controlled including the dimensions of the links, and the types and characteristics of the joints is given in step s1. In step s2, data on the position and orientation of an object to be moved by the articulated manipulator 20 is acquired. In this case, the object is the terminal device 22 attached to the free end of the sixth link c6, and the data represents the orientation and position of the terminal device 22 in the fixed coordinate system. Then, in step s3, the coordinates of the triaxial intersection point, where the rotation axis L1 about which the base 21 and the first link c1 turn, the second rotation axis L2 about which the first link c1 and the second link c2 revolve, and the rotation axis L3 about which the second link c2 and the third link c3 turn are coincident, are determined. The coordinates of the triaxial intersection point are uniquely dependent on the orientation and the position of the object. Therefore, the coordinates of the triaxial intersection point can be determined on the basis of the orientation and position of the object determined in step s2. Then, in step s4, coordinate expressions expressing the coordinates of the triaxial intersection point are produced using, as variables, the first to the third angle, i.e., relative rotation angles of turning of the three links about the three rotation axes other than the three rotation axes intersecting at the triaxial intersection point. The coordinate expressions are an x-, a y- and a z-coordinate expression respectively expressing the x-, the y- and the z-coordinate of the triaxial intersection point. Then, a yz addition coordinate expression representing the sum of the y- and the z-coordinate of the triaxial intersection point, and a yz subtraction coordinate expression representing the remainder of subtraction of the z-coordinate from the y-coordinate of the triaxial intersection point are produced. Then, in step s5, the first to the third angles are calculated by using the x-coordinate expression, the yz addition coordinate expression and the yz subtraction coordinate expression produced in step s4. Then, the fourth to the sixth angle are determined on the basis of the first to the third angle. After the rotation angles for the links c1 to c6 have been determined, the positioning data calculating procedure is ended in step s6.

To facilitate the determination of the rotation angles, suppose that the articulated manipulator 20 shown in FIG. 1 is a true model, an inverted model is in inverse relation to the true model with respect to the z-axis, and an equivalent model is equivalent to the inverted model and has joints including one joint different from that of the inverted model. The rotation angles for the links can more easily be determined after transforming the true model into the inverted model and the equivalent model.

Figure 5:
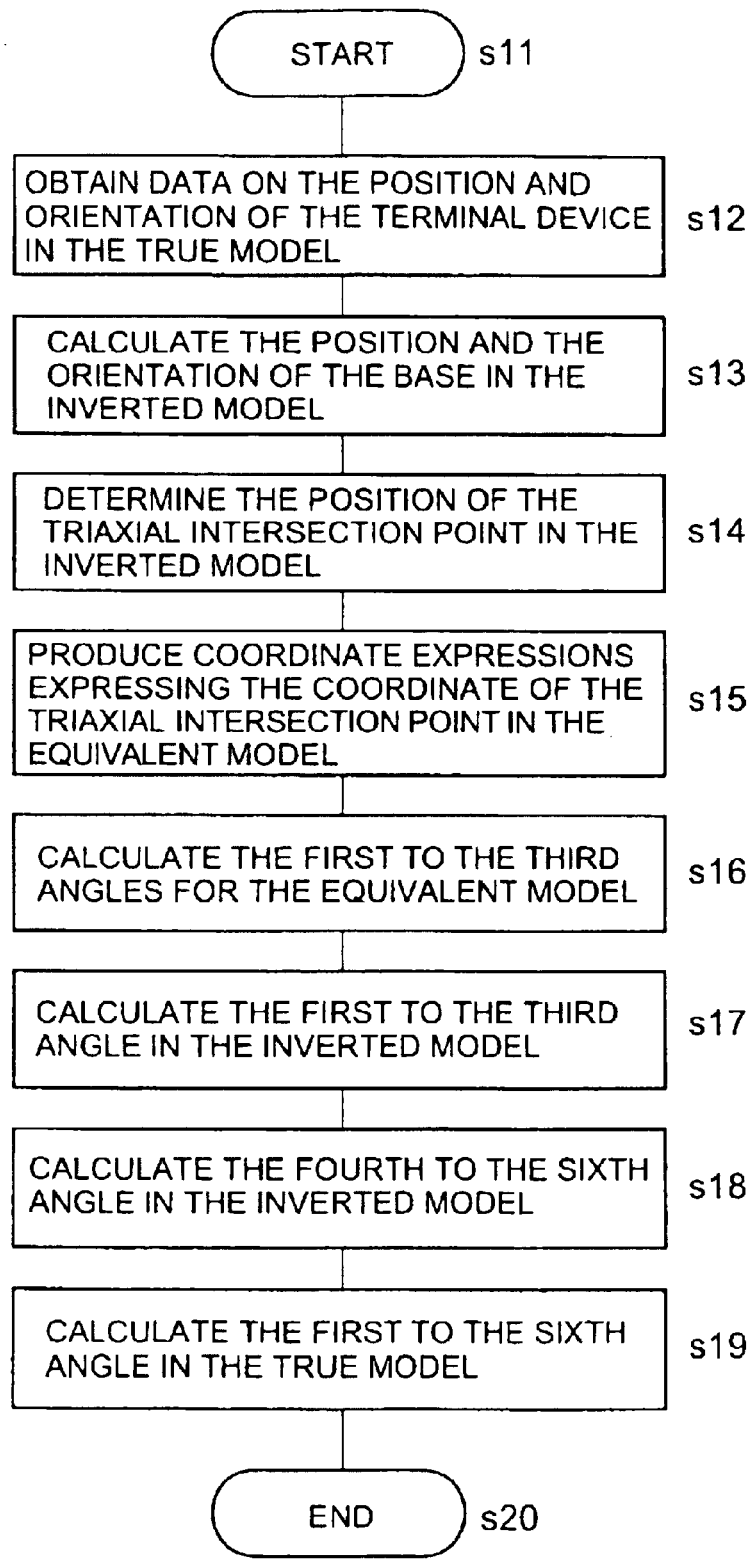
FIG. 5 is a flow chart of a positioning data calculating procedure in a preferred embodiment according to the present invention.

Referring to FIG. 5 showing a flow chart of a positioning data calculating procedure for calculating positioning data for the positioning control of the articulated manipulator 20 shown in FIG. 1, data, on the articulated manipulator 20 as the true model to be controlled, including the dimensions of the links, and the types and characteristics of the joints necessary for calculating rotation angles for the links is given in step s11. In step s12, data on the position and orientation of the terminal device with respect to the base 21 of the true model is acquired. In step s13, a coordinate system and a position for the true model are transformed into those for the inverted model. The position and orientation of the base 21 with respect to the terminal device 22 of the inverted model are calculated. Then, in step s14, the position of the triaxial intersection point in the inverted model is determined on the basis of the position and orientation of the base 21 in the inverted model. In step s15, coordinate expressions expressing the coordinates of the triaxial intersection point in the equivalent model are produced using, as variables, the first to the third angle, i.e., relative rotation angles of turning of the three links about the three rotation axes other than the three rotation axes intersecting at the triaxial intersection point. More concretely, an x-, a y- and a z-coordinate expression respectively expressing the x-, the y- and the z-coordinate of the triaxial intersection point in the equivalent model are produced. Then a yz addition coordinate expression representing the sum of the y- and the z-coordinate of the triaxial intersection point, and a yz subtraction coordinate expression representing the remainder of subtraction of the z-coordinate from the y-coordinate of the triaxial intersection point are produced. Then, in step s16, the first to the third angles for the equivalent model are calculated on the basis of the position of the triaxial intersection point in the inverted model determined in step s14, and the x-coordinate expression, the yz addition coordinate expression and the yz subtraction coordinate expression produced in step s15. Then, in step s17, the first to the third angles for the equivalent model determined in step s16 are converted into the first to the third angle for the inverted model. Then, in step s18, the fourth to the sixth angle are determined on the basis of the first to the third angle. After converting the first to the sixth angle for the inverted model determined in steps s17 and s18 into the first to the sixth angle for the true model, the positioning data calculating procedure is ended in step s20.

Figure 6:
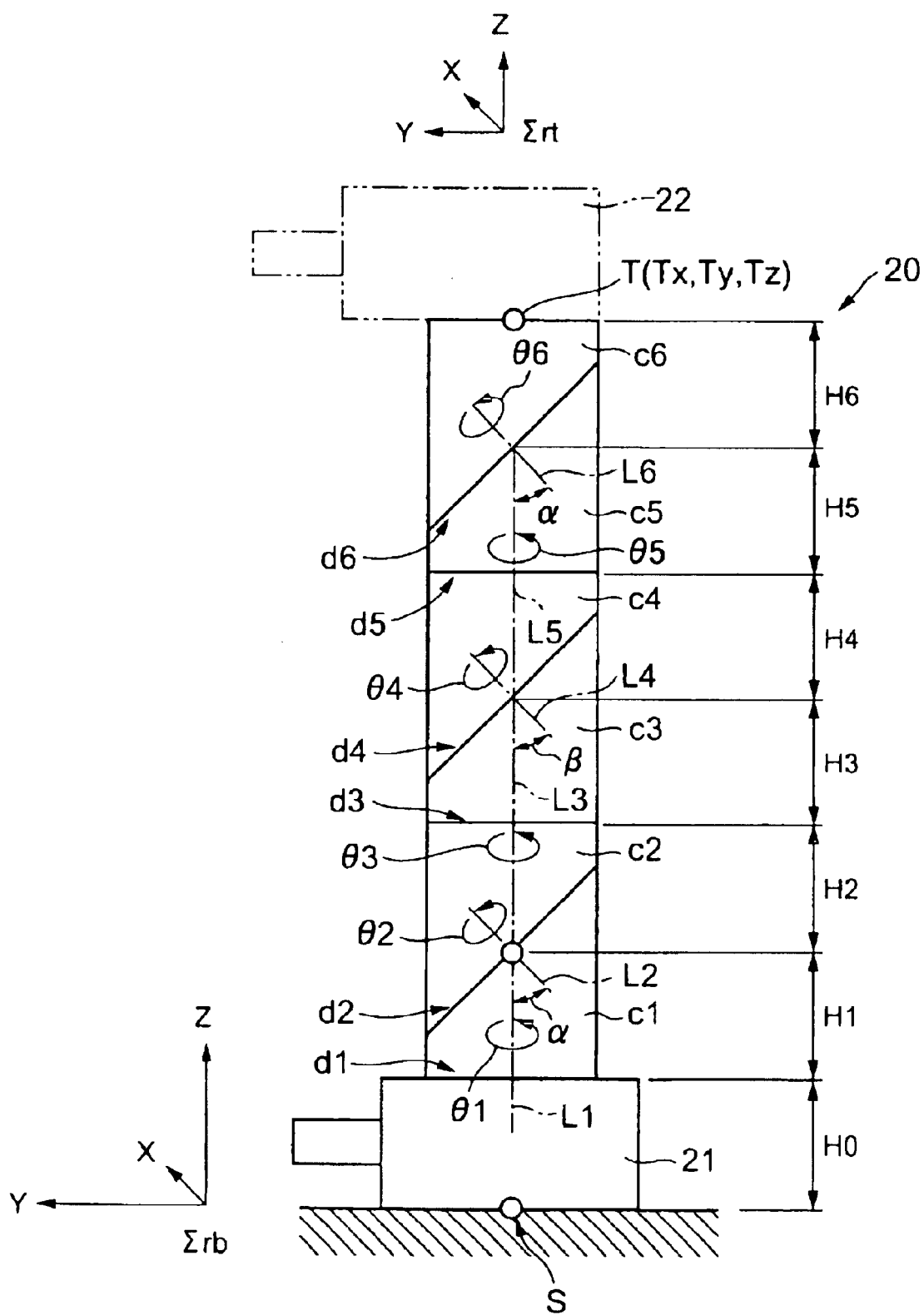
FIG. 6 is a typical view of a true model of an articulated manipulator according to the present invention.

FIG. 6 shows a true model modeling the articulated manipulator 20 of the present invention. The articulated manipulator 20 has a reference coordinate system Σrb fixedly attached to the base 21. The reference coordinate system Σrb has a reference x-, a reference y- and a reference z-axis orthogonally intersecting each other at an origin.

Body-attached coordinate systems are fixedly attached to the links c1 to c6 and the terminal device 22, respectively. The body-attached coordinate systems are three-axis orthogonal coordinate system having their origins at the representative points of the links c1 to c6 and the terminal device 22, respectively. Each of the body-attached coordinate systems has a body-attached x-, a body-attached y- and a body-attached z-axis orthogonally intersecting each other and coincident at the origin.

In the true model shown in FIG. 6, the origin of the reference coordinate system Σrb is coincident with a base representative point S on an imaginary line aligned with the rotation axis L1 about which the first link c1 and the base 21 turn relative to each other. Since the terminal device 22 is fixed to the sixth link c6, he determination of the position and orientation of the terminal device 22 is equivalent to the determination of the position and orientation of the sixth link c6. The position of the terminal device 22 is represented by the coordinates of the representative point T of the sixth link c6 on an imaginary line aligned with the rotation axis L5 abut which the fourth link c4 and the fifth link c5 turn relative to each other.

A terminal coordinate system Σrt, namely, a body-attached coordinate system attached to the terminal device 22, is a three-axis orthogonal coordinate system having its origin coincident with the representative point T of the sixth link c6. The representative point T of the sixth link c6 move in the reference coordinate system Σrb as the links c1 to cy turn relative to each other.

The position of the representative point T is represented by coordinates (Tx, Ty, Tz) in the reference coordinate system Σrb. Tx is a reference x-coordinate, Ty is a reference y-coordinate, and Tz is a reference z-coordinate in the reference coordinate system Σrb. When the links c1 to c6 connected in series and forming a straight arm assembly are turned relative to each other, the orientation of the sixth link changes and, consequently, the terminal coordinate system Σrt turns relative to the reference coordinate system Σrb. The orientation of the sixth link c6 is represented by orientation (qo, qa, qt), where qo, qa and qt are angles through which the terminal coordinate system Σbt is turned about the reference x-, y- and z-axis, respectively.

Suppose that the links c1 to c6 are in a reference state when the links c1 to c6 are extended in the straight arrangement, and the first link c1, the second link c2, the third link c3, the fourth link c4, the fifth link c5 and the sixth link c6 in the reference state are turned through a first rotation angle $\theta_1$, a second rotation angle $\theta_2$, a third rotation angle $\theta_3$, a fourth rotation angle $\theta_4$, a fifth rotation angle $\theta_5$ and a sixth rotation angle $\theta_6$ relative to the base 21, the first link c1, the second link c3, the fourth link c4 and the fifth link c5, respectively.

Figure 7:
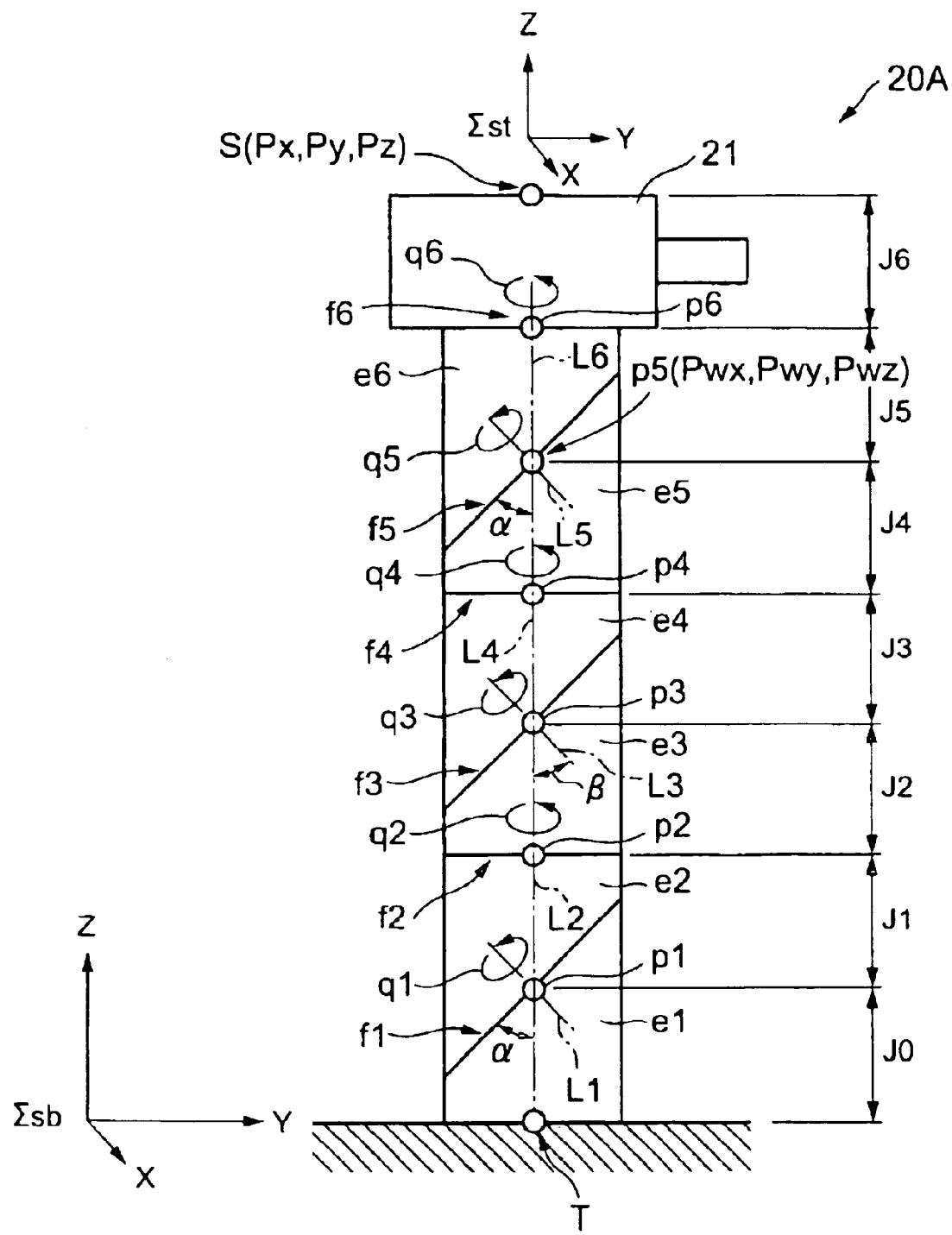
FIG. 7 is a typical view of an inverted model in inverse relation to the true model.
Figure 8:
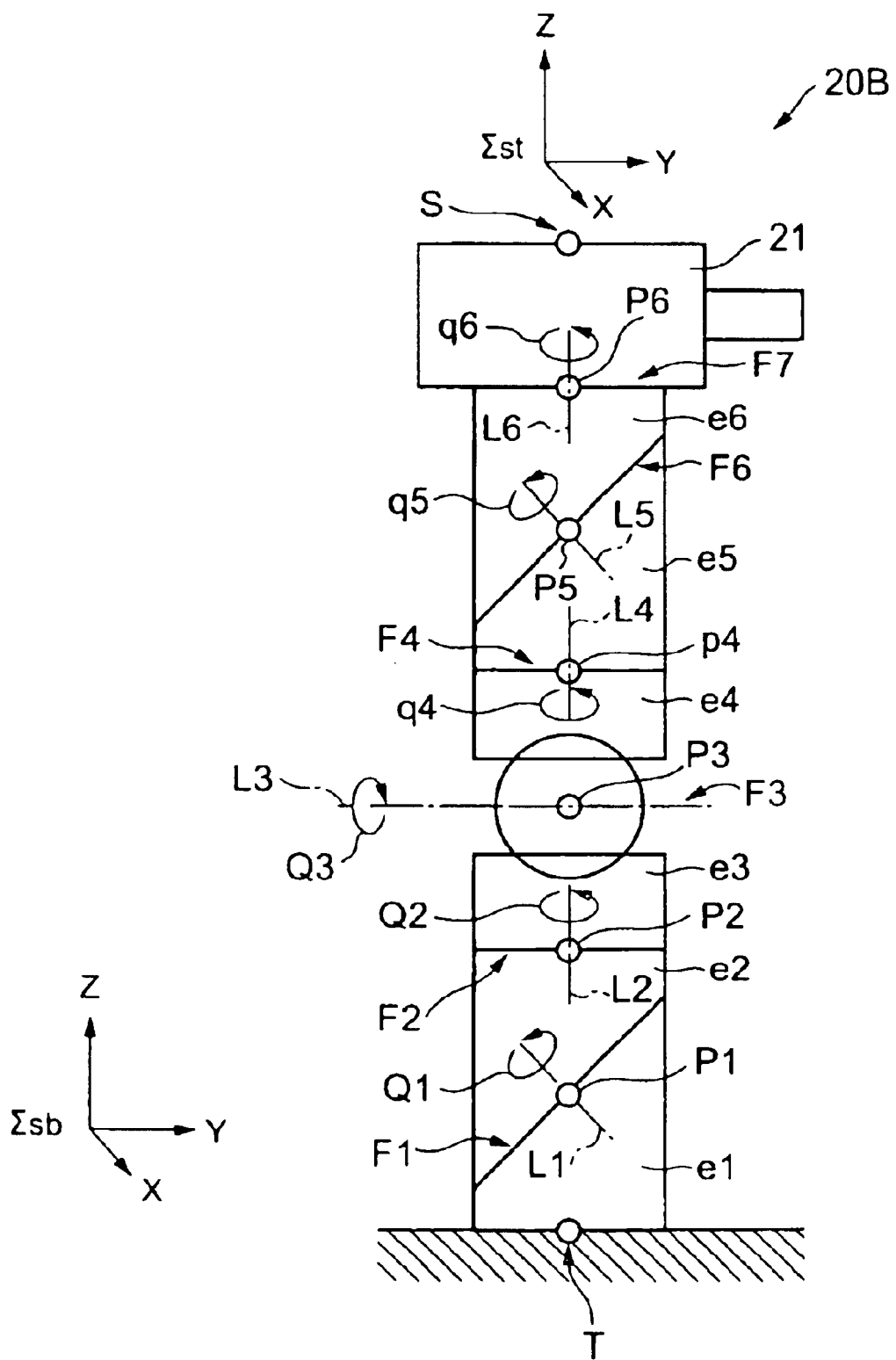
FIG. 8 is a typical view of an equivalent model formed by replacing one of the joints of an articulated manipulator represented by the inverted model shown in FIG. 7 with an equivalent joint.

FIG. 7 is a typical view of an inverted model representing an inverted articulated manipulator 20A in inverse relation to the true model. FIG. 8 is a typical view of an equivalent model representing an equivalent articulated manipulator 20B formed by replacing one of the joints of the articulated inverted manipulator 20A represented by the inverted model shown in FIG. 7 with an equivalent joint. Parts of the models shown in FIGS. 7 and 8 will be designated by designations different from those of the parts of true model and denoted by reference characters different from those indicating the parts of the true model to facilitate understanding.

The respective first links e1, the second links e2, the third links e3, the fourth links e4, the fifth links e5 and the sixth links e6 of the inverted and the equivalent model correspond to the sixth link c1, the fifth link c5, the fourth link c4, the third link c3, the second link c2 and the first link c1 of the true model, respectively. Thus, the first links e1 to the sixth links e6 of the inverted and the equivalent model correspond to the sixth link c6 to the first link c1 of the true model, respectively.

Similarly, joints of the inverted model, rotation angles through which the links e1 to e6 of the inverted model are turned, and longitudinal sizes of the links e1 to e6 of the inverted model are denoted by reference characters f1 to f6, q1 to q6, and i0 to i6 different from those denoting the corresponding joints, rotation angles and longitudinal sizes of the true model, respectively.

The equivalent articulated manipulator 20B represented by the equivalent model differs from the inverted articulated manipulator 20A represented by the inverted model in a joint F3 connecting the third link e3 and the fourth link e4. The joint F3 of the equivalent articulated manipulator 20B connects the third link e3 and the fourth link e4 such that the respective axes of the third link e3 and the fourth link e4 are able to turn about a rotation axis L3 perpendicular thereto. Thus, the third link e3 and the fourth link e4 turn on the joint F3 in a plane including the axes thereof.

In the inverted model, a reference coordinate system Σsb has its origin at the representative point T of the first link e1 coincident with the representative point T of the sixth link c6 of the true model. In the inverted model, a base coordinate system Σst, i.e., a body-attached coordinate system fixed to the base 21, has its origin coincident with the base representative point S. When the links e1 to e6 of the inverted model are extended coaxially in a straight arm assembly, the body x-, the body y- and the body z-axis are parallel to the reference x-, the reference y- and the reference z-axis of the reference coordinate system Σsb, respectively. When the links e1 to e6 are extended coaxially in a straight arm assembly, the axes of the links e1 to e6 are parallel to the reference z-axis of the reference coordinate system Σsb and the base z-axis of the base coordinate system Σst. A direction from the origin of the reference coordinate system Σsb toward the origin of the base coordinate system Σst is a positive direction for the reference z-axis and the body z-axis.

The articulated manipulator 20 in the first embodiment executes steps s1 to s6 when the terminal device 22 is fixed and the base 21 is movable. In the inverted model, the base 21 is regarded as an object, and rotation angles q1 to q6 through which the links e1 to e6 are to be turned, respectively, to set the object in a desired orientation at a desired position are determined.

The rotation angles $\theta_1$ to $\theta_6$ through which the links c1 to c6 of the articulated manipulator 20 represented by the true model are turned to set the terminal device 22 in a desired orientation at a desired position can be determined by converting the rotation angles q1 to q6 determined for the links e1 to e6 of the inverted model.

Rotation angles for the links of an articulated manipulator having a triaxial intersection point on a terminal device, i.e., a movable end, can more easily be determined than those for the links of an articulated manipulator having a triaxial intersection point on a base, i.e., a fixed end. Therefore, the rotation angles $\theta_1$ to $\theta_6$ through which the links c1 to c6 of the articulated manipulator 20 having the triaxial intersection point on the base can easily be determined by converting the rotation angles q1 to q6 determined for the links e1 to e6 of the inverted model into those for the true model.

The positioning data calculating procedure for calculating positioning data will be described with reference to a flow chart shown in FIG. 5. Preparatory operations for determining the rotation $\theta_1$ to $\theta_6$ for the links c1 to c6 are performed in step s11. In step s11, parameters of the articulated manipulator, and data, on the true model, including the longitudinal sizes H0 to H6 of the links c1 to c6, angles at which the rotation axis L2 about which the first link c1 and the second link c2 are turned is inclined to the axes of the first link c1 and the second link c2, the rotation axis L4 about which the third link c3 and the fourth link c4 are turned is inclined to the axes of the third link c3 and the fourth link c4, and an angle at which the rotation axis L6 about which the fifth link c5 and the sixth link c6 are turned is inclined to the axes of the fifth link c5 and the sixth link c6, respectively, is entered. In this embodiment, it is supposed that the rotation axes L2, L4 and L6 are inclined at the same angle α to the axes of the associated links, and the angle α=45°.

After the parameters of the articulated manipulator and the data on the articulated manipulator have been determined, data on the position and orientation of the terminal device 22 with respect to the reference coordinate system Σrb of the true model is acquired in step s12. More specifically, coordinates (Tx, Ty, Tz) of the representative point T of the sixth link c6, and the orientation (qo, qa, qt) of the sixth link c6 are acquired.

In step s13, a transformation matrix for transforming the true model into the inverted model is produced, and the orientation of the base 21 of the inverted model is determined by using the transformation matrix. The orientation of the base 21 of the inverted model is represented by angles qx, qy and qz through which the base coordinate system Σst is turned about the reference x-, the reference y- and the reference z-axis, respectively, of the reference coordinate system Σsb.

After the orientation (qx, qy, qz) of the base 21 has been determined, the position of the representative point S of the base 21 of the inverted model is determined. The position of the representative point S is represented by coordinates Px, Py and Pz on the reference x-, the reference y- and the reference z-axis of the reference coordinate system Σsb.

On step s14, the position of the triaxial intersection point is determined. The triaxial intersection point is coincident with the representative point p5 of the fifth link. In the articulated manipulator 20 shown in FIG. 1, the triaxial intersection point is coincident with the intersection of the rotation axis L5 about which the fifth link e5 and the sixth link e6 are turned and the axes of the fifth link e5 and the sixth link e6, and is on the joint connecting the fifth link e5 and the sixth link e6. A transformation matrix $R_{O5}$ for transforming a reference coordinate system into a body-attached coordinate system attached to the fifth link e5 is produced. The transformation matrix $R_{O5}$ is expressed by Expression (1).

$$R_{O1} = Rx[\alpha] \cdot Rz[q_1] \cdot Rx[-\alpha]$$

$$R_{O2} = R_{O1} \cdot Rz[q_2]$$

$$R_{O3} = R_{O2} \cdot Rx[\alpha] \cdot Rz[q_3] \cdot Rx[-\alpha]$$

$$R_{O4} = R_{O3} \cdot Rz[q_4]$$

$$R_{O5} = R_{O4} \cdot Rx[\alpha] \cdot Rz[q_5] \cdot Rx[-\alpha] \quad (1)$$

where $R_{O1}$ to $R_{O5}$ are transformation matrices for converting the reference coordinate system into the body-attached coordinate systems, and α is the angle at which the rotation axes are inclined to the axes of the associated links at the joints. The angle α in matrix $R_{O1}$ is the angle at which the rotation axis L1 about which the first link e1 and the second link e2 are turned inclines to the axes of the links e1 and e2. The angle α in matrix $R_{O3}$ is the angle at which the rotation axis L3 about which the third link e3 and the fourth link e4 are turned inclines to the axes of the links e3 and e4. The angle α in matrix $R_{O5}$ is the angle at which the rotation axis L5 about which the fifth link e5 and the sixth link e6 are turned inclines to the axes of the links e5 and e6. The second link e2 is turned through a first rotation angle $q_1$ relative to the first link e1, the third link e3 is turned through a second rotation angle $q_2$ relative to the second link e2, the fourth link e4 is turned through a third rotation angle $q_3$ relative to the third link e3, the fifth link e5 is turned through a fourth rotation angle $q_4$ relative to the fourth link e4, the sixth link e6 is turned through a fifth rotation angle $q_5$ relative to the fifth link e5, and the base 21 is turned through a sixth rotation angle $q_6$ relative to the sixth link e6. When the links e1 to e6 are extended in a straight arm assembly, the rotation angles $q_1$ to $q_6$ are zero.

In Expression (1), Rz[θ], Ry[θ] and Rx[θ] are rotation matrixes for turning the orientation of the body-attached coordinate system relative to the reference coordinate system. The rotation matrices Rx[θ], Ry[θ] and Rz[θ] are used for turning the body-attached coordinate system through an angle θ about the reference x-, the reference y- and the reference z-axis, respectively. Components of the rotation matrices Rz[θ], Ry[θ] and Rx[θ] are expressed by Expressions (2). (3) and (4). respectively.

$$Rz[\theta] = \begin{pmatrix} \cos\theta & -\sin\theta & 0 \\ \sin\theta & \cos\theta & 0 \\ 0 & 0 & 1 \end{pmatrix} \quad (2)$$

$$Ry[\theta] = \begin{pmatrix} \cos\theta & 0 & \sin\theta \\ 0 & 1 & 0 \\ -\sin\theta & 0 & \cos\theta \end{pmatrix} \quad (3)$$

$$Rx[\theta] = \begin{pmatrix} 1 & 0 & 0 \\ 0 & \cos\theta & -\sin\theta \\ 0 & \sin\theta & \cos\theta \end{pmatrix} \quad (4)$$

where $\theta$ is a variable and is substituted by an optional value. A matrix $Rz[q1]$ is obtained by substituting $\theta$ of Expression (2) by $q_1$. In this specification, $\sin\theta$ and $\cos\theta$ represent the sine and cosine of the angle $\theta$, and a symbol "•" indicates multiplication. The position of the representative point p5 of the fifth link e5 is expressed by Expression (5).

$$p5 = \begin{pmatrix} 0 \\ 0 \\ i0 \end{pmatrix} + R_{01} \cdot \begin{pmatrix} 0 \\ 0 \\ i1 \end{pmatrix} + R_{02} \cdot \begin{pmatrix} 0 \\ 0 \\ i2 \end{pmatrix} + R_{03} \cdot \begin{pmatrix} 0 \\ 0 \\ i3 \end{pmatrix} + R_{04} \cdot \begin{pmatrix} 0 \\ 0 \\ i4 \end{pmatrix} \quad (5)$$

Suppose that the distance between the representative point T of the terminal device and the representative point p1 of the first link e1 is i0, the distance between the representative point p1 of the first link e1 and the representative point p2 of the second link e2 is i1, the distance between the representative point p2 of the second link e2 and the representative point p3 of the third link e3 is i2, the distance between the representative point p3 of the third link e3 and the representative point p4 of the fourth link e4 is i3, the distance between the representative point p4 of the fourth link e4 and the representative point p5 of the fifth link e5 is i4, the distance between the representative point p5 of the fifth link e5 and the representative point p6 of the sixth link e6 is i5, and the distance between the representative point p6 of the sixth link e6 and the representative point S of the base is i6.

The representative point p1 of the first link e1 is coincident with a point, on the joint connecting the first link e1 and the second link e2, where the rotation axis L1 about which the first link e1 and the second link e2 are turned, and the axis of the first link e1 intersect each other. The second representative point p2 of the second link e2 is on the rotation axis L2 about which the second link e2 and the third link e3 are turned and on the joint connecting the links e2 and e3. The representative point p3 of the third link e3 is coincident with a point, on the joint connecting the third link e3 and the fourth link e4, where the rotation axis L3 about which the third link e3 and the fourth link e4 are turned, and the axis of the third link e3 intersect each other.

The representative point p4 of the fourth link e4 is coincident with a point, on the joint connecting the fourth link e4 and the fifth link e5, where the rotation axis L4 about which the fourth link e4 and the fifth link e5 are turned, and the axis of the fourth link e4 intersect each other. The representative point p5 of the fifth link e5 is coincident with a point, on the joint connecting the fifth link e5 and the sixth link e6, where the rotation axis L5 about which the fifth link e5 and the sixth link e6 are turned, and the axis of the fifth link e5 intersect each other. The representative point p6 of the sixth link e6 is coincident with a point, on the joint connecting the sixth link e6 and the base 22, where the rotation axis L6 about which the sixth link e6 and the base 21 are turned, and the axis of the sixth link e6 intersect each other.

The position of the triaxial intersection point coincident with the representative point p5 of the fifth link e5 can be determined by using Expression (5). A transformation matrix Ruh for converting the base coordinate system $\Sigma$st into the reference coordinate system $\Sigma$sb is produced.

$$Ruh = Rx[qx] \cdot Ry[qy] \cdot Rz[qz] \quad (6)$$

Values of the coordinates (Pwx, Pwy, Pwz) of the representative point p5 of the fifth link e5 can be calculated by using Expression (7). The coordinates of the representative point p5 of the fifth link e5 are transformed by using Expression (8) for the following operations.

$$p5 = \begin{pmatrix} Px \\ Py \\ Pz \end{pmatrix} - Ruh \cdot \begin{pmatrix} 0 \\ 0 \\ i5 + i6 \end{pmatrix} = \begin{pmatrix} Pwx \\ Pwy \\ Pwz \end{pmatrix} \quad (7)$$

$$\begin{pmatrix} Pxn \\ Pyn \\ Pzn \end{pmatrix} = \begin{pmatrix} Pwx \\ Pwy + Pwz - i0 \\ Pwy - Pwz - i0 \end{pmatrix} \quad (8)$$

An x-coordinate expression Pxn expressing the x-coordinate of the representative point p5 of the fifth link e5 is produced. A yz added value represented by a yz addition coordinate expression Pyn is obtained by adding up the y- and the z-coordinate, and subtracting the distance i0 between the terminal representative point T and the representative point p1 of the first link e1 from the addition of the y- and the z-coordinate. A yz subtraction value represented by a yz subtraction coordinate expression Pzn is obtained by subtracting the z-coordinate from the y-coordinate, and subtracting the distance between the terminal representative point T and the representative point p1 of the first link e1 from the remainder of subtraction of the z-coordinate from the y-coordinate.

The representative point p5 of the fifth link e5 is coincident with the triaxial intersection point. Therefore, the position of the triaxial intersection point coincident with the representative point p5 can be determined by using Expression (7).

In step s15, the articulated manipulator 20A modeled by the inverted model is transformed into the articulated manipulator 20B modeled by the equivalent model. Rotation angles $Q_1$, $Q_2$ and $Q_3$ for the first link e1, the second link e2 and the third link e3 are calculated.

Transformation matrices $R_{01}$ to $R_{03}$ in Expression (9) are used for transforming the orientations of the representative points p1 to p3 of the first link e1 to the third link e3 in the reference coordinate system $\Sigma$sb. In Expression (9), $\alpha$ indicates an angle at which the rotation axis L1 about which the first link e1 and the second link e2 turn inclines to the axes of the links e1 and e2. The position of the representative point p5 of the fifth link e5 of the equivalent model shown in FIG. 8 is expressed by Expression (10).

$$R_{01} = Rx[\alpha] \cdot Rz[Q_1] \cdot Rx[-\alpha]$$
$$R_{02} = R_{01} \cdot Rz[Q_2] \quad (9)$$
$$R_{03} = R_{02} \cdot Ry[Q_3]$$

$$p5 = R_{01} \cdot \begin{pmatrix} 0 \\ 0 \\ 1 \end{pmatrix} + R_{03} \cdot \begin{pmatrix} 0 \\ 0 \\ nr \end{pmatrix} \quad (10)$$

Suppose that the distance i0 between the terminal representative point T and the representative point p1 of the first link e1 is neglected, (i1+i2)=1, where (i1+i2) is the distance between the representative point p1 of the first link e1 and the representative point p3 of the third link e3, and (i3+i4)/(i1+i2)=nr, where (i3+i4) is the distance between the representative point p3 of the third link e3 and the representative point p5 of the fifth link e5.

The actual position of the representative point p5 of the fifth link e5 is equal to a value obtained by multiplying a value calculated by using Expression (10) by the distance (i1+i2) between the representative point p1 of the first link e1 and the representative point p3 of the third link e3, and adding the distance i0 between the terminal representative point T and the representative point p1 of the first link e1 to the product of multiplication. The position of the representative point p5 of the fifth link e5 determined by using Expression (10) is expressed by Expression (11).

$$p5 = \begin{pmatrix} P5x \\ P5y \\ P5z \end{pmatrix} \quad (11)$$

$P5x = -\sin\alpha \cdot \sin Q_1 + nr(-\cos Q_3 \cdot \sin\alpha \cdot \sin Q_1 + (\cos Q_1 \cdot \cos Q_2 - \cos\alpha \cdot \sin Q_1)\sin Q_2)$ $P5y = -\cos\alpha \cdot \sin\alpha + \cos\alpha \cdot \cos Q_1 \cdot \sin\alpha + nr(\cos Q_3$
$(-\cos\alpha \cdot \sin\alpha \cdot \cos\alpha \cdot \cos Q_1 \cdot \sin\alpha) -$
$(\cos\alpha \cdot \cos Q_2 \cdot \sin Q_1 + (\cos^2\alpha \cdot \cos Q_1 + \sin^2\alpha)$
$\sin Q_2)\sin Q_3)$ $P5z = \cos^2\alpha + \cos Q_1 \cdot \sin^2\alpha + nr(\cos Q_3(\cos^2\alpha +$
$\cos Q_1 \cdot \sin^2\alpha) + (\cos Q_2 \cdot \sin\alpha \cdot \sin Q_1 +$
$(-\cos\alpha \cdot \sin\alpha \cdot \cos\alpha \cdot \cos Q_1 \cdot \sin\alpha)$
$\sin Q_2)\sin Q_3)$ When the angle α at which the rotation axis L1 about which the first link e1 and the second link e2 turn inclines to the axes of the links e1 and e2 is 45°, Expression (12) is obtained by substituting the angle α in Expression (11) by 45°.

$$P5 = \begin{bmatrix} -\dfrac{\sin Q_1}{\sqrt{2}} + nr\left(-\dfrac{\cos Q_3 \cdot \sin Q_1}{\sqrt{2}} + \left(\cos Q_1 \cdot \cos Q_2 - \dfrac{\sin Q_1 \cdot \sin Q_2}{\sqrt{2}}\right)\sin Q_3\right) \\ -\dfrac{1}{2} + \dfrac{\cos Q_1}{\sqrt{2}} + nr\left(\left(-\dfrac{1}{2} + \dfrac{\cos Q_1}{\sqrt{2}}\right)\cos Q_3 + \left(\dfrac{\cos Q_2 \cdot \sin Q_1}{\sqrt{2}} + \left(\dfrac{1}{2} + \dfrac{\cos Q_1}{\sqrt{2}}\right)\sin Q_2\right)\sin Q_3\right) \\ \dfrac{1}{2} + \dfrac{\cos Q_1}{\sqrt{2}} + nr\left(\left(\dfrac{1}{2} + \dfrac{\cos Q_1}{\sqrt{2}}\right)\cos Q_3 + \left(\dfrac{\cos Q_2 \cdot \sin Q_1}{\sqrt{2}} + \left(-\dfrac{1}{2} + \dfrac{\cos Q_1}{2}\right)\sin Q_2\right)\sin Q_3\right) \end{bmatrix} \quad (12)$$

Expression (13) shows the x-coordinate expression Pxn representing the x-coordinate P5x of the representative point p5 of the fifth link e5 in the reference coordinate system, a yz addition coordinate expression Pyn representing the sum of the y- and the z-coordinate of the representative point pt of the fifth link e5, and a yz subtraction coordinate expression Pzn representing the remainder of subtraction of the z-coordinate from the y-coordinate of the representative point p5 of the fifth link e5.

$$P5x = Pxn = nr \cdot \cos Q_1 \cdot \cos Q_2 \cdot \sin Q_3 - \dfrac{\sin Q_1(1 + nr \cdot \cos Q_3 + nr \cdot \sin Q_2 \cdot \sin Q_3)}{\sqrt{2}} \quad (13)$$

$$P5y + p5z = Pyn$$
$$= \sqrt{2}\,(nr \cdot \cos Q_2 \cdot \sin Q_1 \cdot \sin Q_3 + \dfrac{\cos Q_1(1 + nr \cdot \cos Q_3 + nr \cdot \sin Q_2 \cdot \sin Q_3)}{\sqrt{2}}$$

$$P5y - P5z = Pzn = 1 + nr \cdot \cos Q_3 - nr \cdot \sin Q_2 \cdot \sin Q_3$$

The expressions are thus transformed, and the simultaneous equations are solved to produce Expression (14). A third rotation angle $Q_3$ is calculated by using Expression (14). Thus, analytical expressions representing the first rotation angle $Q_3$, a second rotation angle $Q_2$ and third rotation angle $Q_3$ in the equivalent model can easily be produced.

$$\cos Q_3 = \dfrac{-2 - 2 \cdot nr^2 + 2 \cdot Pxn^2 + Pyn^2 + Pzn^2}{4 \cdot nr} \quad (14)$$

In step s16, the values of the x-coordinate P5x of the representative point p5 of the fifth link e5, the value of the sum of the y- and the z-coordinate of the representative point p5 of the fifth link e5, and the value of the remainder of subtraction of the z-coordinate from the y-coordinate of the representative point p5 of the fifth link e5 the remainder of subtraction of the z-coordinate from the y-coordinate of the representative point p5 of the fifth link e5 calculated by using Expression (8), namely, the x-coordinate expression Pxn, the yz addition coordinate expression Pyn and the yz subtraction coordinate expression Pzn, in step s14 are substituted into the expressions representing the first rotation angle $Q_1$ to the third rotation angle Q3 obtained in step s15 to determine the numerical values of the first rotation angle $Q_1$ to the third rotation angle $Q_3$. Four combinations of those numerical values are possible, provided that the desired position of the base 21 is not a singular point. Step s17 is executed after the numerical values of the first rotation angle $Q_1$ to the third rotation angle $Q_3$ in the equivalent model have been determined.

In step s17, the first rotation angle $Q_1$ to the third rotation angle $Q_3$ in the equivalent model determined in step s16 are converted into a first rotation angle $q_1$ to a third rotation angle $q_3$ in the inverted model. Expression (15) represents cos $q_3$. In Expressions (15), (16) and (17), α is an angle at which the rotation axis L3 about which the third link e3 and the fourth link e4 turn inclines to the axes of the links e3 and e4.

$$\cos q_3 = (\cos ec\ \alpha)^2 \cdot \cos Q_3 - (\cot \alpha)^2 \quad (15)$$

where cosec α represents the cosecant of the angle α, and cot α represents the cotangent of the angle α. The third rotation angle $q_3$ in the inverted model can be determined by substituting the value of the third rotation angle $Q_3$ in the equivalent model into Expression (15). Values of cos $q_2$ and sin $q_2$ are calculated by using Expression (16)

$\cos q_2 = -(\cot \alpha(1-\cos q_3 \cdot \sin Q_2 + \cos ec\alpha \cdot \cos Q_2 \cdot \sin q_3)\sin Q_3/D_2$ $\sin q_2 = \cos ec\alpha(\cos \alpha \cdot \cos Q_2(1-\cos Q_3) - \sin Q_2 \cdot \sin q_3)\sin Q_3/D_2 \quad (16)$ $D_2$ included in Expression (16) is represented by Expression (17).

$D_2 = (\cos \alpha)^2(1-\cos q_3)^2 + (\sin q_3)^2 \quad (17)$

The value of the second rotation angle $q_2$ in the inverted model can be calculated by using Expression (16).

The first rotation angle $Q_1$ in the equivalent model is equal to the first rotation angle $q_1$ in the inverted model. Four combinations of the first rotation angle $q_1$ to the third rotation angle $q_3$ in the inverted model, similarly to those in the equivalent model, provided that the triaxial intersection point is not a singular point.

After the first rotation angle $q_1$ to the third rotation angle $q_3$ in the inverted model have been determined in step s17, a fourth rotation angle $q_4$ to a sixth rotation angle $q_6$ in the inverted model are determined in step s18. A transformation matrix Rwh for the fifth link e5 is represented by Expression (18).

$$Rwh = [R_{03}]^t \cdot Ruh \quad (18)$$

A transposed matrix obtained by transposing a transformation matrix $R_{03}$ is multiplied by a transformation matrix Ruh for transforming the base coordinate system Σst with respect to the reference coordinate system Σsb. The transformation matrix $R_{03}$ can by obtained by using Expression (1) because the first rotation angle $q_1$ to the third rotation angle $q_3$ are known. The numerical solution of the transformation matrix Ruh can be obtained by using the foregoing expressions. The transformation matrix Ruh can be represented by Expression (6). The fourth rotation angle $q_4$ to the sixth rotation angle $q_6$ can be determined by solving Expression (19) when the numerical values of the components of the transformation matrix Rwh are known. In Expression (19), α is an angle at which the rotation axis L5 about which the fifth link e5 and the sixth link e6 turn inclines to the axes of the links e5 and e6.

$$Rwh = Rz[q_4] \cdot Rx[\alpha] \cdot Rz[q_5] \cdot Rx[-\alpha] \cdot Rz[q_6] \quad (19)$$

Two combinations of the fourth rotation angle $q_4$ to the sixth rotation angle $q_6$ in the inverted model are possible for each of the combinations of the first rotation angle $q_1$ to the third rotation angle $q_3$, provided that the representative point of the base is not a singular point. Thus, eight combinations of the first rotation angle $q_1$ to the sixth rotation angle $q_6$ are possible, provided that the triaxial intersection point and the base representative point are not singular points. Step s19 is executed after the fourth rotation angle $q_4$ to the sixth rotation angle $q_6$ in the inverted model have been determined in step s18.

In step s19, the first rotation angle $q_1$ to the sixth rotation angle $q_6$ for the first link e1 to the sixth link e6 in the inverted model are substituted into Expression (20) to convert the first rotation angle $q_1$ to the sixth rotation angle $q_6$ into the first rotation angle $\theta_1$ to the sixth rotation angle $\theta_6$ for the first link c1 to the sixth link c6 in the true model. After the first rotation angle $\theta_1$ to the sixth rotation angle $\theta_6$ have been determined, the positioning data calculating procedure is ended in step s20.

$$\theta_1 = q_6$$
$$\theta_2 = q_5$$
$$\theta_3 = q_4$$
$$\theta_4 = q_3$$
$$\theta_5 = q_2$$
$$\theta_6 = q_1 \quad (20)$$

Thus, the first rotation angle $\theta_1$ to the sixth rotation angle $\theta_6$ for the links c1 to c6 in the true model can easily be determined by the foregoing positioning data calculating procedure. Thus, the rotation angles through which the links must be turned can be determined to set the terminal device 22 in a desired orientation at a desired position. The links of the articulated manipulator are controlled on the basis of the thus calculated data to set the terminal device 22 in the desired orientation at the desired position. The positioning data calculating procedure may be carried out either by a computer or by an operator.

The thus calculated rotation angles for the links are analytical solutions. Therefore, those rotation angles are accurate and can be calculated in a short time as compared with those obtained by convergence calculation and interpolatory approximation. The rotation angles can be calculated by the positioning data position procedure by a computer having a low processing ability. The eight combinations of the rotation angles can be obtained, and the optimum one of the eight combinations can selectively determined, considering energy cost and obstructs around the articulated manipulator. The first rotation angle $\theta_1$ to the sixth rotation angle $\theta_6$ for the first link c1 to the sixth link c6 of the articulated manipulator 20 shown in FIG. 20 can easily be determined by transforming the true model into the inverted model.

The rotation angles $\theta_1$ to $\theta_6$ for the links c1 to c6 in the true model may be determined by producing analytical equations having variables including the distances H0 to H6 between the representative points of the links of the articulated manipulator, the angles α at which the rotation axes L1 to L6 incline to the axels of the related links, the position T (Tx, Ty, Tz) of the terminal device 22, and the orientation (qo, qa, qt) of the terminal device 22 using the calculated data, and substituting values into the variables of the analytical equations.

In this embodiment, the rotation angles of the links of the articulated manipulator are determined on an assumption that the angles at which the rotation axes incline to the axes of the related links connected by the diagonal joints are 45°. However, the angles at which the rotation axes incline to the axes of the related links connected by the diagonal joints may be different from each other or may be any suitable angles other than 45°.

For example, in the articulated manipulator 20A in the inverted model shown in FIG. 7, the rotation angles $q_1$ to $q_6$ for the links e1 to e6 can be determined by multiplying the yz addition coordinate expression Pyn and the yz subtraction coordinate expression Pzn by suitable coefficients, even if the angle at which the rotation axis L1 about which the first link e1 and the second link e2 turn inclines to the axes of the links e1 and e2 is α, the angle at which the rotation axis L3 about which the third link e3 and the fourth link e4 turn inclines to the axes of the links e3 and e4 is β, and the angle at which the rotation axis L5 about which the fifth link e5 and the sixth link e6 turn inclines to the axes of the links e5 and e6 is γ. The first to the third rotation angle can more easily be determined when at least one of the rotation axes other than those intersecting at the triaxial intersection point inclines at 45° to the axes of the related links.

Even in a case where the angle at which the rotation axis L1 about which the first link e1 and the second link e2 turn inclines to the axes of the links e1 and e2 is 45°, and the angle at which the rotation axis L3 about which the third link e3 and the fourth link e4 turn inclines to the axes of the links e3 and e4 is not 45° in the inverted model, the first to the third rotation angle can easily be determined by converting the joint connecting the third link e3 and the fourth link e4 into an equivalent model shown in FIG. 8. More concretely, the expression for adding up the y- and the z-coordinate of the triaxial intersection point, and the expression for subtracting the z-coordinate from the y-coordinate can be simplified, and thereby the first to the third angle can more easily be determined.

Similarly, in a case where the angle at which the rotation axis L3 about which the third link e3 and the fourth link e4 turn inclines to the axes of the links e3 and e4 is 45°, and the angle at which the rotation axis L1 about which the first link e1 and the second link e2 turn inclines to the axes of the links e1 and e2 is not 45°, the first to the third rotation angle can easily be determined by converting the joint connecting the first link e1 and the second link e2 into an equivalent model.

When the articulated manipulator has at least the rotation axis about which the two links connected by the diagonal joint among the joints connecting the first to the third link turn inclines at an angle of 45° to the axes of the two links connected by the same diagonal joint, the rotation angles for the links can more simply be determined. The triaxial intersection point in this embodiment is on the base in the true model, the triaxial intersection point may be on the terminal device. If the triaxial inter section point is on the terminal device, the rotation angles for the link can easily be determined without requiring the transformation of the true model into the inverted model.

As shown in the true model, in a first articulated manipulator in which rotation axes L1, L2 and L3 near a fixed part intersect each other at a triaxial intersection point, a rotation axis L3 about which third and fourth links turn inclines at 45° to the axes of the third and the fourth link, and a rotation axis L6 about which fifth and sixth links turn inclines at an optional angle to the axes of the fifth and the sixth link, or in a second articulated manipulator in which rotation axes L1, L2 and L3 near a fixed part intersect each other at a triaxial intersection point, the rotation axis L3 about which third and fourth links turn inclines at an optional angle to the axes of the third and the fourth link, and a rotation axis L6 about which fifth and sixth links turn inclines at 45° to the axes of the fifth and the sixth link, rotation angles for the links can more easily be determined by transforming a true model into an inverted model, and converting the joint having the rotation axis inclined at the optional angle to the axes of the related links into an equivalent model.

As shown in the inverted model, in a third articulated manipulator in which rotation axes L4, L5 and L6 near a free part intersect each other at a triaxial intersection point, a rotation axis L1 about which first and second links turn inclines at 45° to the axes of the first and the second link, and a rotation axis L3 about which third and fourth links turn inclines at an optional angle to the axes of the third and the fourth link, or in a fourth articulated manipulator in which rotation axes L4, L5 and L6 near a free part intersect each other at a triaxial intersection point, the rotation axis L1 about which first and second links turn inclines at an optional angle to the axes of the first and the second link, and a rotation axis L3 about which third and fourth links turn inclines at 45° to the axes of the third and the fourth link, rotation angles for the links can easily be determined by converting the joint having the rotation axis inclined at the optional angle to the axes of the related links into an equivalent model.

The rotation angles for the links can be determined even if the rotation axis of the joint connecting the third link e3 and the fourth link e4 is orthogonal to the axes of the links e3 and e4 as shown in FIG. 8.

Figure 9:
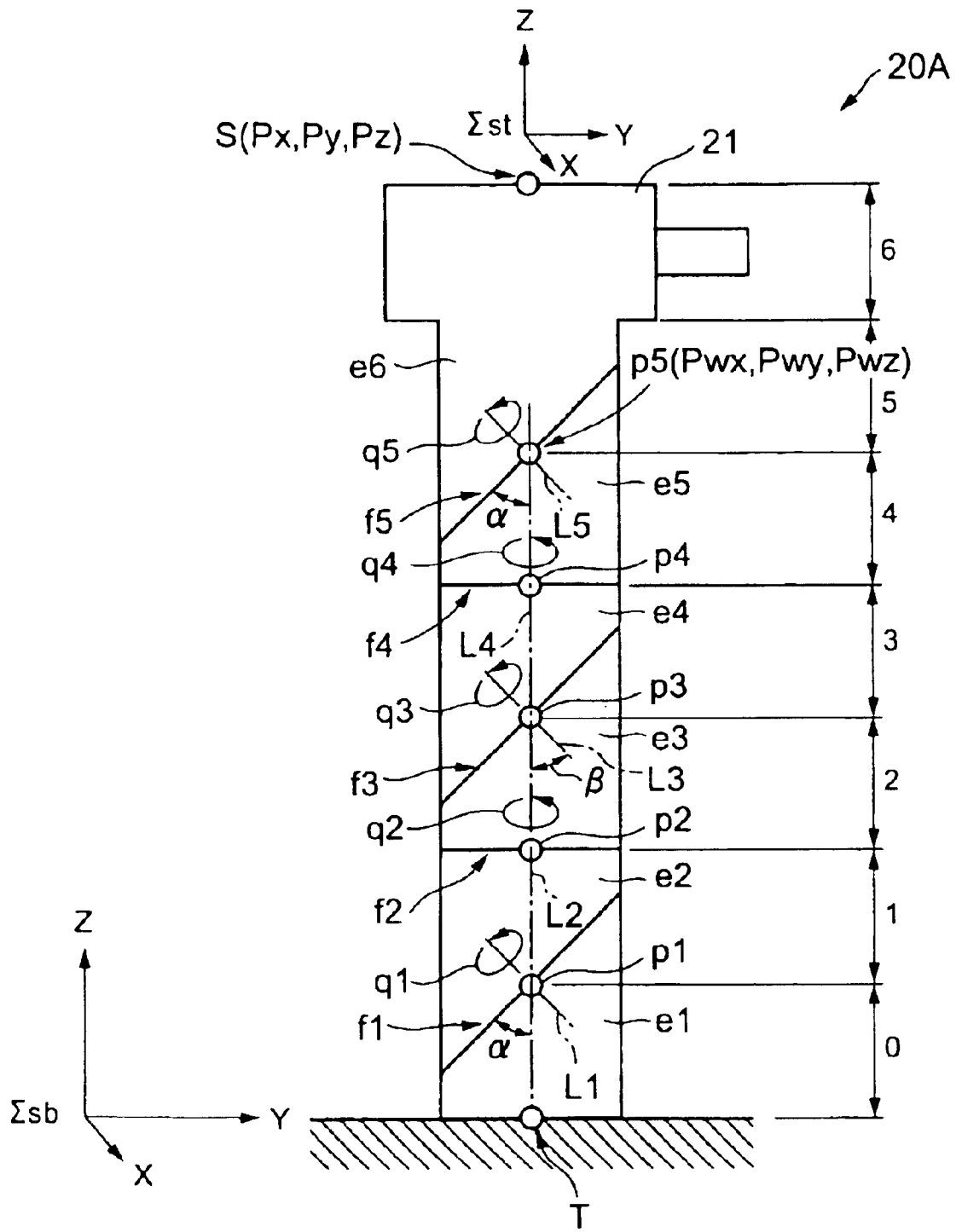
FIG. 9 is a typical view of an articulated manipulator in a second embodiment according to the present invention.
Figure 10:
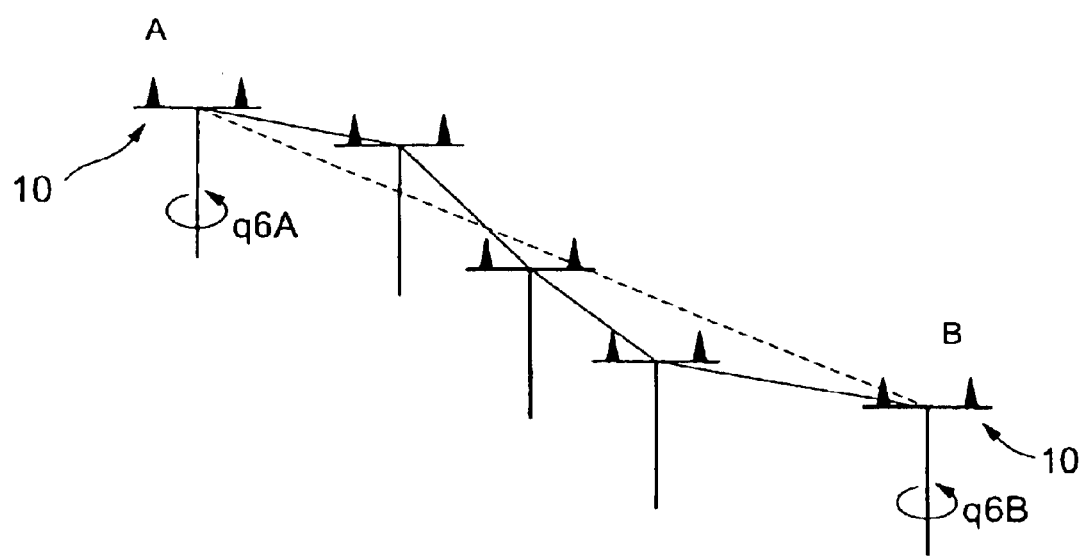
FIG. 10 is a diagrammatic view of assistance in explaining an orientation control operation for controlling the orientation of a conventional articulated manipulator.

FIG. 9 shows a model modeling an articulated manipulator in a second embodiment according to the present invention. In the model shown in FIG. 9, a sixth link e6 and a base 21 corresponding to those of the inverted model shown in FIG. 7 are fixedly joined together. Rotation angles $q_1$ to $q_5$ for a first link e1 to a fifth link e5 can be determined by the aforesaid positioning data calculating procedure.

As apparent from the foregoing description, according to the present invention, the first to the sixth angles for locating the object in a desired orientation at a desired position can be determined in a short time. Thus, the rotation angles through which the links are to be turned can be determined every time the object is moved. For example, data on the orientation and position of the object moving along a prescribed path is entered continuously to change the angular position of the links can sequentially be changed on the basis of the continuously entered data. Thus, the object can quickly and smoothly be moved to the desired position.

The values of the rotation angles can analytically be determined, and all the possible combinations of the rotation angles can be obtained. In a six-degree of freedom articulated manipulator, eight combinations of rotation angles can be obtained. Optimum one of the eight combinations of the rotation angles for the links of the articulated manipulator can be chosen to locate the object in a desired orientation at a desired position. For example, optimum one of the eight combinations of the rotation angles is selected taking into consideration energy cost and obstacles around the articulated manipulator.

According to the present invention, the first to the fifth rotation angles for locating the object in a desired orientation at a desired position can be determined in a short time. Thus, rotation angles for the links can be determined every time the object is moved. For example, data on the orientation and position of the object moving along a prescribed path is entered continuously to change the angular position of the links can sequentially be changed on the basis of the continuously entered data. Thus, the object can quickly and smoothly be moved to the desired position.

The values of the rotation angles can analytically be determined, and all the possible combinations of the rotation angles for moving the object to the desired position can be obtained. One of the combinations of the rotation angles for the links of the articulated manipulator can be chosen to locate the object in a desired orientation at a desired position. For example, optimum one of the combinations of the rotation angles is selected taking into consideration energy cost and obstacles around the articulated manipulator.

According to the present invention, the calculating device is capable of quickly determining the first to the sixth rotation angles to locate the object in a desired orientation at a desired position. Thus, the rotation angles through which the links are to be turned can be determined every time the object is moved. The output device sends the calculated data to the articulated manipulator. For example, the input device enters data on the orientation and position of the object moving along a prescribed path continuously, and the links are turned through the rotation angles provided by the output device, and thereby the angular position of the links can sequentially be changed on the basis of the continuously entered data. Thus, the object can quickly and smoothly be moved to the desired position.

The calculating device determines values of the rotation angles analytically, and all the possible combinations of the rotation angles to move the object to the desired position can be obtained. For example, in a six-degree of freedom articulated manipulator, eight combinations of rotation angles can be obtained. One of the combinations of the rotation angles for the links of the articulated manipulator can be chosen to locate the object in a desired orientation at a desired position. For example, optimum one of the combinations of the rotation angles is selected taking into consideration energy cost and obstacles around the articulated manipulator.

According to the present invention, the calculating device is capable of quickly determining the first to the fifth rotation angles to locate the object in a desired orientation at a desired position. Thus, the rotation angles through which the links are to be turned can be determined every time the object is moved. The output device sends the calculated data to the articulated manipulator. For example, the input device enters data on the orientation and position of the object moving along a prescribed path continuously, and the links are turned through the rotation angles provided by the output device, and thereby the angular position of the links can sequentially be changed on the basis of the continuously entered data. Thus, the object can quickly and smoothly be moved to the desired position.

The calculating device determines values of the rotation angles, and all the possible combinations of the rotation angles can be obtained. One of the combinations of the rotation angles for the links of the articulated manipulator can be chosen to locate the object in a desired orientation at a desired position. For example, optimum one of the combinations of the rotation angles is selected taking into consideration energy cost and obstacles around the articulated manipulator.

According to the present invention, the rotation axes about which the object and the sixth link turn, the sixth and the fifth link turn, and the fifth and the fourth link turn, respectively, are coincident at the triaxial intersection point. Therefore the coordinates of the triaxial intersection point can uniquely be determined by an orientation controller when the position and orientation of the object is determined. Thus, the orientation controller is able to determine analytically the first to the sixth rotation angle for the links for locating the object in a desired orientation at a desired position. Whereas the conventional articulated manipulator provided with six joints is incapable of analytically determining the rotation angles, the articulated manipulator of the present invention is capable of analytically determining the rotation angles. Consequently, the object can quickly and accurately be located.

When the rotation axis about which the two links connected by at least the diagonal joints among the joints connecting the first to the third link turn inclines at an angle of 45° to the axes of the links connected by the same diagonal joint, the orientation controller is able to determine the rotation angles by using simplified expressions. Consequently, time necessary for the orientation controller to determine the first to the sixth rotation angles can further shortened.

According to the present invention, the rotation axes about which the object and the sixth link turn, the sixth and the fifth link turn, and the fifth and the fourth link turn, respectively, are coincident at the triaxial intersection point. Therefore the coordinates of the triaxial intersection point can uniquely be determined by an orientation controller when the position and orientation of the object is determined. Thus, the orientation controller is able to determine analytically the first to the sixth rotation angle for the links for locating the object in a desired orientation at a desired position.

When the rotation axis about which the two links connected by at least the diagonal joints among the joints connecting the first to the third link turn inclines at an angle of 45° to the axes of the links connected by the same diagonal joint, the orientation controller is able to determine the rotation angles by using simplified expressions. Consequently, time necessary for the orientation controller to determine the first to the sixth rotation angles can further shortened. Whereas the conventional articulated manipulator provided with five joints is incapable of analytically determining the rotation angles, the articulated manipulator of the present invention is capable of analytically determining the rotation angles. Consequently, the object can quickly and accurately be located.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A positioning data calculating procedure for calculating relative rotation angles for first to sixth links arranged in series and included in an articulated manipulator including coaxial joints each connecting the adjacent ones of the first to the sixth link so that the adjacent links are able to turn about a rotation axis aligned with their axes, and diagonal joints each connecting the adjacent ones of the first to the sixth link so that the adjacent links are able to revolve about a rotation axis inclined to their axes, in which the sixth link is attached rotatably to a predetermined object, and a rotation axis about which the sixth link and the object turn, a rotation axis about which the fifth and the sixth link turn and a rotation axis about which the fourth and the fifth link turn intersect each other at a triaxial intersection point, said positioning data calculating procedure comprising:

a data entering step of entering data on position and orientation of the object in a reference coordinate system with an x-axis, a y-axis and a z-axis orthogonally intersecting each other and fixed relative to the first link;

a triaxial intersection point coordinate calculating step of calculating x-, y- and z-coordinate of the triaxial intersection point in the reference coordinate system on the basis of the entered data on the position and orientation of the object;

a first-to-third rotation angle calculating step of calculating first to third rotation angles by solving coordinate expressions including an x-coordinate expression representing the x-coordinate of the triaxial intersection point, a yz addition coordinate expression representing the sum of the y- and the z-coordinate of the triaxial intersection point, and a yz subtraction coordinate expression representing the remainder of subtraction of the z-coordinate from the y-coordinate of the triaxial intersection point, and including a first rotation angle corresponding to a rotation angle through which the second link is turned relative to the first link, a second rotation angle corresponding to a rotation angle through which the third link is turned relative to the second link, and a third rotation angle corresponding to a rotation angle through which the fourth link is turned relative to the third link as variables; and a fourth-to-sixth angle calculating step of calculating a fourth rotation angle through which the fifth link is turned relative to the fourth link, a fifth rotation angle through which the sixth link is turned relative to the fifth link, and a sixth rotation angle through which the object is turned relative to the sixth link on the basis of the first to the third rotation angle and the orientation of the object.

2. A rotation angle calculating procedure for calculating relative rotation angles for first to sixth links arranged in series and included in an articulated manipulator including coaxial joints each connecting the adjacent ones of the first to the sixth link so that the adjacent links are able to turn about a rotation axis aligned with their axes, and diagonal joints each connecting the adjacent ones of the first to the sixth link so that the adjacent links are able to revolve about a rotation axis inclined to their axes, in which the sixth link is attached rotatably to a predetermined object, and a rotation axis about which the fifth and the sixth link turn, and a rotation axis about which the fourth and the fifth link turn intersect each other at a biaxial intersection point, said rotation angle calculating procedure comprising:

a data entering step of entering data on a position and orientation of the object in a reference coordinate system with an x-axis, a y-axis and a z-axis orthogonally intersecting each other and fixed relative to the first link;

a biaxial intersection point coordinate calculating step of calculating x-, y- and z-coordinate of the biaxial intersection point in the reference coordinate system on the basis of the entered data on the position and orientation of the object;

a first-to-third angle calculating step of calculating first to third angles by solving coordinate expressions including an x-coordinate expression representing the x-coordinate of the biaxial intersection point, a yz addition coordinate expression representing the sum of the y- and the z-coordinate of the biaxial intersection point, and a yz subtraction coordinate expression representing the remainder of subtraction of the z-coordinate from the y-coordinate of the biaxial intersection point, and including a first angle corresponding to a rotation angle through which the second link is turned relative to the first link, a second angle corresponding to a rotation angle through which the third link is turned relative to the second link, and a third angle corresponding to a rotation angle through which the fourth link is turned relative to the third link as variables; and a fourth-and-fifth angle calculating step of calculating a fourth rotation angle through which the fifth link is turned relative to the fourth link, and a fifth rotation angle through which the sixth link is turned relative to the fifth link, on the basis of the first to the third rotation angle and the orientation of the object.

3. A positioning data calculating apparatus for calculating relative rotation angles of first to sixth links arranged in series and included in an articulated manipulator including coaxial joints each connecting the adjacent ones of the first to the sixth link so that the adjacent links are able to turn about a rotation axis aligned with their axes, and diagonal joints each connecting the adjacent ones of the first to the sixth link so that the adjacent links are able to revolve about a rotation axis inclined to their axes, in which the sixth link is attached rotatably to a predetermined object, and a rotation axis about which the sixth link and the object turn, a rotation axis about which the fifth and the sixth link turn and a rotation axis about which the fourth and the fifth link turn intersect each other at a triaxial intersection point, said positioning data calculating apparatus comprising:

a data entering means for entering data on a position and orientation of the object in a reference coordinate system with an x-axis, a y-axis and a z-axis orthogonally intersecting each other and fixed relative to the first link;

a calculating means for calculating an x-, a y- and z-coordinate of the triaxial intersection point in the reference coordinate system on the basis of the entered data on the position and orientation of the object, determining first to third rotation angles by solving coordinate expressions including an x-coordinate expression representing the x-coordinate of the triaxial intersection point, a yz addition coordinate expression representing the sum of the y- and the z-coordinate of the triaxial intersection point, and a yz subtraction coordinate expression representing the remainder of subtraction of the z-coordinate from the y-coordinate of the triaxial intersection point, and including a first angle corresponding to a rotation angle through which the second link is turned relative to the first link, a second angle corresponding to a rotation angle through which the third link is turned relative to the second link, and a third angle corresponding to a rotation angle through which the fourth link is turned relative to the third link as variables, and calculating a fourth rotation angle through which the fifth link is turned relative to the fourth link, a fifth rotation angle through which the sixth link is turned relative to the fifth link, and a sixth rotation angle through which the object is turned relative to the sixth link on the basis of the first to the third rotation angle and the orientation of the object; and an output means for providing calculated data calculated by the calculating means.

4. A positioning data calculating apparatus for calculating relative rotation angles for first to sixth links arranged in series and included in an articulated manipulator including coaxial joints each connecting the adjacent ones of the first to the sixth link so that the adjacent links are able to turn about a rotation axis aligned with their axes, and diagonal joints each connecting the adjacent ones of the first to the sixth link so that the adjacent links are able to revolve about a rotation axis inclined to their axes, in which the sixth link is attached rotatably to a predetermined object, and a rotation axis about which the fifth link and the sixth link turn, and a rotation axis about which the fourth and the fifth link turn intersect each other at a biaxial intersection point, said positioning data calculating apparatus comprising:

a data entering means for entering data on a position and orientation of the object in a reference coordinate system with an x-axis, a y-axis and a z-axis orthogonally intersecting each other and fixed relative to the first link;

a calculating means for calculating x-, y- and z-coordinate of the biaxial intersection point in the reference coordinate system on the basis of the entered data on the position and orientation of the object, determining first to third rotation angles by solving coordinate expressions including an x-coordinate expression representing the x-coordinate of the biaxial intersection point, a yz addition coordinate expression representing the sum of the y- and the z-coordinate of the biaxial intersection point, and a yz subtraction coordinate expression representing the remainder of subtraction of the z-coordinate from the y-coordinate of the biaxial intersection point, and including a first angle corresponding to a rotation angle through which the second link is turned relative to the first link, a second angle corresponding to a rotation angle through which the third link is turned relative to the second link, and a third angle corresponding to a rotation angle through which the fourth link is turned relative to the third link as variables, and calculating a fourth rotation angle through which the fifth link is turned relative to the fourth link, and a fifth rotation angle through which the sixth link is turned relative to the fifth link on the basis of the first to the third rotation angle and the orientation of the object; and an output means for providing calculated data calculated by the calculating means.

5. An articulated manipulator comprising:

first to sixth links arranged in series;

coaxial joints each connecting the adjacent ones of the first to the sixth link so that the adjacent links are able to turn about a rotation axis aligned with their axes; and diagonal joints each connecting the adjacent ones of the first to the sixth link so that the adjacent links are able to revolve about a rotation axis inclined to their axes;

wherein the sixth link is attached rotatably to a predetermined object so that the object is able to turn about the axis of the sixth link, the fifth and the sixth link are connected by the diagonal joint, the fourth and the fifth link are connected by the coaxial joint, the third and the fourth link are connected by the diagonal joint, the second and the third link are connected by the coaxial joint, and the first and the second link are connected by the diagonal joint.

6. An articulated manipulator comprising:

first to sixth links arranged in series;

coaxial joints each connecting the adjacent ones of the first to the sixth link so that the adjacent links are able to turn about a rotation axis aligned with their axes; and diagonal joints each connecting the adjacent ones of the first to the sixth link so that the adjacent links are able to revolve about a rotation axis inclined to their axes;

wherein the sixth link is fixedly connected to a predetermined object, the fifth and the sixth link are connected by the diagonal joint, the fourth and the fifth link are connected by the coaxial joint, the third and the fourth link are connected by the diagonal joint, the second and the third link are connected by the coaxial joint, and the first and the second link are connected by the diagonal joint.

7. A positioning data calculating procedure for calculating relative rotation angles for first to sixth links arranged in series and included in an articulated manipulator including coaxial joints each connecting the adjacent ones of the first to the sixth link so that the adjacent links are able to turn about a rotation axis aligned with their axes, and diagonal joints each connecting the adjacent ones of the first to the sixth link so that the adjacent links are able to revolve about a rotation axis inclined to their axes, in which the sixth link is attached rotatably to a predetermined object, and a rotation axis about which the sixth link and the object turn, a rotation axis about which the fifth and the sixth link turn and a rotation axis about which the fourth and the fifth link turn intersect each other at a triaxial intersection point, said posiitioning data calculating procedure comprising:

a data entering step of entering data on position and orientation of the object in a reference coordinate system with an x-axis, a y-axis and a z-axis orthogonally intersecting each other and fixed relative to the first link;

a triaxial intersection point coordinate calculating step of calculating x-, y-and z-coordinate of the triaxial intersection point in the reference coordinate system on the basis of the entered data on the position and orientation of the object;

a first-to-third rotation angle calculating step of calculating first to third rotation angles including a first rotation angle corresponding to a rotation angle through which the second link is turned relative to the first link, a second rotation angle corresponding to a rotation angle through which the third link is turned relative to the second link, and a third rotation angle corresponding to a rotation angle through which the fourth link is turned relative to the third link as variables; and a fourth-to-sixth angle calculating step of calculating a fourth rotation angle through which the fifth link is turned relative to the fourth link, a fifth rotation angle through which the sixth link is turned relative to the fifth link, and a sixth rotation angle through which the object is turned relative to the sixth link on the basis of the first to the third rotation angle and the orientation of the object.

8. A rotation angle calculating procedure for calculating relative rotation angles for first to sixth links arrange in series and included in an articulated manipulator including coaxial joints each connecting the adjacent ones of the first to the sixth link so that the adjacent links are able to turn about a rotation axis aligned with their axes, and diagonal joints each connecting the adjacent ones of the first to the sixth link so that the adjacent links are able to revolve about a rotation axis inclined to their axes, in which the sixth link is attached rotatably to a predetermined object, and a rotation axis about which the fifth and the sixth link turn, and a rotation axis about which the fourth and the fifth link turn intersect each other at a biaxial intersection point, said rotation angle calculating procedure comprising:

a data entering step of entering data on a position and orientation of the object in a reference coordinate system with an x-axis, a y-axis and a z-axis orthogonally in a reference coordinate system with an x-axis, a y-axis and a z-axis orthogonally intersecting each other and fixed relative to the first link;

a biaxial intersection point coordinate calculating step of calculating x-, y- and z-coordinate of the biaxial intersection point in the reference coordinate system on the basis of the entered data on the position and orientation of the object.

a first-to-third angle calculating step of calculating first to third angles including a first angle corresponding to a rotation angle through which the second link is turned relative to the first link, a second angle corresponding to a rotation angle through which the third link is turned relative to the second link, and a third angle corresponding to a rotation angle through which the fourth link is turned relative to the third link as variables; and fourth-and-fifth angle calculating step of calculating a fourth rotation angle through which the fifth link is turned relative to the fourth link, and a fifth rotation angle through which the sixth link is turned relative to the fifth link, on the basis of the first to the third rotation angle and the orientation of the object.

9. A positioning data calculating apparatus for calculating relative rotation angles of first to sixth links arranged in series and included in an articulated manipulator including coaxial joints each connecting the adjacent ones of the first to the sixth link so that the adjacent links are able to turn about a rotation axis aligned with their axes, and diagonal joints each connecting the adjacent ones of the first to the sixth link so that the adjacent links are able to revolve about a rotation axis inclined to their axes, in which the sixth link is attached rotatably to a predetermined object, and a rotation axis about which the sixth link and the object turn, a rotation axis about which the fifth and the sixth link turn and a rotation axis about which the fourth and the fifth link turn intersect each other at a triaxial intersection point, said positioning data calculating apparatus comprising:

a data entering means for entering data on a position and orientation of the object in a reference coordinate system with an x-axis, a y-axis and a z-axis orthogonally intersecting each other and fixed relative to the first link;

a calculating means for calculating an x-, a y-and z-coordinate of the triaxial intersection point in the reference coordinate system on the basis of the entered data on the position and orientation of the object, determining first to third rotation angles including a first angle corresponding to a rotation angle through which the second link is turned relative to the first link, a second angle corresponding to a rotation angle through which the third link is turned relative to the second link, and a third angle corresponding to a rotation angle through which the fourth link is turned relative to the third link as variables, and calculating a fourth rotation angle through which the fifth link is turned relative to the fourth link, a fifth rotation angle through which the sixth link is turned relative to the fifth link, and a sixth rotation angle through which the object is turned relative to the sixth link on the basis of the first to the third rotation angle and the orientation of the object; and an output means for providing calculated data calculated by the calculating means.

10. A positioning data calculating apparatus for calculating relative rotation angle for first to sixth links arranged in series and included in an articulated manipulator including coaxial joints each connecting the adjacent ones of the first to the sixth link so that the adjacent links are able to turn about a rotation axis aligned with their axes, and diagonal joints each connecting the adjacent ones of the first to the sixth link so that the adjacent links are able to revolve about a rotation axis inclined to their axes, in which the sixth link is attached rotatably to a predetermined object, and a rotation axis about which the fifth link and the sixth link turn, and a rotation axis about which the fourth link and the fifth link turn, intersect each other at a biaxial intersection point, said positioning data calculating apparatus comprising:

a data entering means for entering data on a position and orientation of the object in a reference coordinate system with an x-axis, a y-axis and a z-axis othogonally intersecting each other and fixed relative to the first link;

a calculating means for calculating x-, y-and z-coordinate of the biaxial intersection point in the reference coordinate system on the basis of the entered data on the position and orientation of the object, determining first to third rotation angles including a first angle corresponding to a rotation angle through which the secon link is turned relative to the first link, a second angle corresponding to a rotation angle through which the third link is turned relative to the second link, and a third angle corresponding to a rotation angle through which the fourth link is turned relative to the third link as variables, and calculating a fourth rotation angle through which the fifth link is turned relative to the fourth link, and a fifth rotation angle through which the sixth link is turned relative to the fifth link on the basis of the first to the third rotation angle and orientation of the object; and an output means for providing calculated data calculated by the calculating means.

\* \* \* \* \*